United States Patent
Sato et al.

(10) Patent No.: US 11,999,652 B2
(45) Date of Patent: Jun. 4, 2024

(54) GLASS FOR MAGNETIC RECORDING MEDIUM SUBSTRATE OR FOR GLASS SPACER TO BE USED IN MAGNETIC RECORDING/REPRODUCING DEVICE, MAGNETIC RECORDING MEDIUM SUBSTRATE, MAGNETIC RECORDING MEDIUM, GLASS SPACER TO BE USED IN MAGNETIC RECORDING/REPRODUCING DEVICE, AND MAGNETIC RECORDING/REPRODUCING DEVICE

(71) Applicant: HOYA CORPORATION, Tokyo (JP)

(72) Inventors: Koichi Sato, Tokyo (JP); Kazuaki Hashimoto, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 17/784,528

(22) PCT Filed: Dec. 11, 2020

(86) PCT No.: PCT/JP2020/046405
§ 371 (c)(1),
(2) Date: Jun. 10, 2022

(87) PCT Pub. No.: WO2021/117897
PCT Pub. Date: Jun. 17, 2021

(65) Prior Publication Data
US 2023/0192530 A1    Jun. 22, 2023

(30) Foreign Application Priority Data

Dec. 13, 2019   (JP) ................................ 2019-225368

(51) Int. Cl.
G11B 5/73      (2006.01)
C03C 3/087     (2006.01)
C03C 3/095     (2006.01)
G11B 5/235     (2006.01)
G11B 5/72      (2006.01)

(52) U.S. Cl.
CPC ............. *C03C 3/095* (2013.01); *C03C 3/087* (2013.01); *G11B 5/235* (2013.01); *G11B 5/72* (2013.01)

(58) Field of Classification Search
None
See application file for complete search history.

(56) References Cited

U.S. PATENT DOCUMENTS

| 2005/0079391 A1* | 4/2005 | Ikenishi ............ G11B 5/73921 |
| | | 428/846.9 |
| 2011/0123832 A1* | 5/2011 | Matsumoto ............. C03C 3/095 |
| | | 501/63 |
| 2011/0277508 A1* | 11/2011 | Osawa .................... C03C 3/097 |
| | | 65/97 |
| 2012/0107647 A1* | 5/2012 | Matsumoto ............. C03C 3/087 |
| | | 501/63 |
| 2012/0188663 A1* | 7/2012 | Isono ................. G11B 5/73921 |
| | | 360/110 |
| 2014/0036644 A1* | 2/2014 | Matsumoto ........... C03C 21/002 |
| | | 428/846.9 |
| 2015/0087495 A1 | 3/2015 | Nishizawa et al. |
| 2015/0225282 A1* | 8/2015 | Kuang .................... C03C 3/068 |
| | | 501/78 |
| 2016/0225396 A1* | 8/2016 | Shimojima ........... C03C 21/002 |
| 2021/0221729 A1* | 7/2021 | Sato ........................ C03C 3/093 |
| 2022/0411317 A1 | 12/2022 | Sato et al. |

FOREIGN PATENT DOCUMENTS

| EP | 0858974 A1 * | 8/1998 | ............. C03C 15/00 |
| EP | 2036867 A1 * | 3/2009 | ............. C03C 15/00 |
| JP | 2000187828 A | 7/2000 | |
| JP | 201505479 A | 3/2015 | |
| JP | 2015-224150 A | 12/2015 | |
| WO | 2013/183569 A1 | 12/2013 | |
| WO | 2013/183626 A1 | 12/2013 | |
| WO | 2015/033800 A1 | 3/2015 | |
| WO | WO-2018088563 A1 * | 5/2018 | ............. C03C 3/085 |
| WO | 2019/221102 A1 | 11/2019 | |

OTHER PUBLICATIONS

International Search Report in PCT/JP2020/046405 dated Feb. 16, 2021.

* cited by examiner

*Primary Examiner* — William J Klimowicz
(74) *Attorney, Agent, or Firm* — Global IP Counselors, LLP

(57) ABSTRACT

Provided is a glass for a magnetic recording medium substrate or for a glass spacer for a magnetic recording/reproducing apparatus, in which the total content of $Li_2O$, $Na_2O$, $K_2O$, $B_2O_3$, and $ZnO$ ($Li_2O+Na_2O+K_2O+B_2O_3+ZnO$) is in a range of 0 mol % or more and 3 mol % or less, the mole ratio of the total content of $Al_2O_3$ and $MgO$ relative to the total content of $SiO_2$ and $CaO$ $[(Al_2O_3+MgO)/(SiO_2+CaO)]$ is in a range of 0.30 or more and 0.6 or less, the total content of $SiO_2$ and $Al_2O_3$ ($SiO_2+Al_2O_3$) is in a range of 64 mol % or more and 85 mol % or less, and the total content of $SiO_2$, $Al_2O_3$, $MgO$, and $CaO$ ($SiO_2+Al_2O_3+MgO+CaO$) is in a range of 87 mol % or more and 98 mol % or less.

20 Claims, No Drawings

GLASS FOR MAGNETIC RECORDING MEDIUM SUBSTRATE OR FOR GLASS SPACER TO BE USED IN MAGNETIC RECORDING/REPRODUCING DEVICE, MAGNETIC RECORDING MEDIUM SUBSTRATE, MAGNETIC RECORDING MEDIUM, GLASS SPACER TO BE USED IN MAGNETIC RECORDING/REPRODUCING DEVICE, AND MAGNETIC RECORDING/REPRODUCING DEVICE

CROSS-REFERENCE TO RELATED APPLICATIONS

This is a U.S. National stage application of International Patent Application No. PCT/JP2020/046405, filed on Dec. 11, 2020, which, in turn, claims priority to Japanese Patent Application No. 2019-225368, filed in Japan on Dec. 13, 2019. The entire contents of Japanese Patent Application No. 2019-225368 are hereby incorporated herein by reference.

BACKGROUND

Field of the Invention

The present invention relates to a glass for a magnetic recording medium substrate or for a glass spacer for a magnetic recording/reproducing apparatus, a magnetic recording medium substrate, a magnetic recording medium, a glass spacer for a magnetic recording/reproducing apparatus, and a magnetic recording/reproducing apparatus.

Background Information

BACKGROUND ART

Heretofore, a substrate made from an aluminum alloy has been used for a substrate for a magnetic recording medium such as a hard disk (magnetic recording medium substrate). However, as for a substrate made of an aluminum alloy, drawbacks such as being likely to deform and the like have been pointed out.

Therefore, nowadays magnetic recording medium substrates made of glass are widely used.

JP 2015-224150A discloses alkali-free glass. JP 2015-224150A discloses that the glass described in JP 2015-224150A can be used as a glass substrate for a magnetic disk (see paragraph 0014 in JP 2015-224150A).

SUMMARY

In a step of forming a magnetic recording layer on a magnetic recording medium substrate, usually, film formation is performed at high temperatures or heat treatment is performed at high temperatures after film formation. Thus, a glass for a magnetic recording medium substrate needs to have high heat resistance capable of withstanding high temperature treatment, specifically, needs to have a high glass transition temperature.

Furthermore, a glass for a magnetic recording medium substrate needs to be easy to produce, that is, to have high productivity.

As described above, it is desired that the glass for a magnetic recording medium substrate has high heat resistance and productivity. However, as a result of studies conducted by the inventors of the present invention, it was revealed that, although JP 2015-224150A discloses a glass with a high glass transition temperature, there is still demand for improvement in productivity.

An aspect of the present invention aims to provide a glass for a magnetic recording medium substrate having high heat resistance and productivity.

An aspect of the present invention relates to a glass for a magnetic recording medium substrate or for a glass spacer for a magnetic recording/reproducing apparatus (hereinafter, also referred to as "glass A"), in which the total content of $Li_2O$, $Na_2O$, $K_2O$, $B_2O_3$, and ZnO ($Li_2O+Na_2O+K_2O+B_2O_3+ZnO$) is in a range of 0 mol % or more and 3 mol % or less, a mole ratio of the total content of $Al_2O_3$ and MgO relative to the total content of $SiO_2$ and CaO [$(Al_2O_3+MgO)/(SiO_2+CaO)$] is in a range of 0.30 or more and 0.6 or less, the total content of $SiO_2$ and $Al_2O_3$ ($SiO_2+Al_2O_3$) is in a range of 64 mol % or more and 85 mol % or less, and the total content of $SiO_2$, $Al_2O_3$, MgO, and CaO ($SiO_2+Al_2O_3+MgO+CaO$) is in a range of 87 mol % or more and 98 mol % or less.

Also, another aspect of the present invention relates to a glass for a magnetic recording medium substrate or for a glass spacer for a magnetic recording/reproducing apparatus (hereinafter, also referred to as "glass B"), in which a mole ratio of the total content of $Al_2O_3$ and MgO relative to the total content of $SiO_2$ and CaO [$(Al_2O_3+MgO)/(SiO_2+CaO)$] is in a range of 0.30 or more and 0.6 or less, the total content of $SiO_2$ and $Al_2O_3$ ($SiO_2+Al_2O_3$) is in a range of 64 mol % or more and 85 mol % or less, the total content of $SiO_2$, $Al_2O_3$, MgO, and CaO ($SiO_2+Al_2O_3+MgO+CaO$) is in a range of 87 mol % or more and 98 mol % or less, and the glass has a glass transition temperature of 740° C. or more.

The glass A and the glass B have the above glass composition, and can have high heat resistance and high productivity. High productivity refers to high meltability in an embodiment, for example. Also, in an embodiment, high productivity refers to enabling continuous use of the same polishing pad for a longer period of time in a polishing process that is usually performed for processing a magnetic recording medium substrate, for example. A glass having high heat resistance and high productivity is also suitable as a glass for a magnetic recording medium substrate, and is also suitable as a glass for a glass spacer for a magnetic recording/reproducing apparatus.

According to an aspect of the present invention, it is possible to provide a glass for a magnetic recording medium substrate or for a glass spacer for a magnetic recording/reproducing apparatus having high heat resistance and productivity. Furthermore, according to an aspect, it is also possible to provide a magnetic recording medium substrate made of the above glass, and a magnetic recording medium that includes this magnetic recording medium substrate. Also, according to an aspect, it is possible to provide a glass spacer for a magnetic recording apparatus made of the above glass. Furthermore, according to an aspect, it is possible to provide a magnetic recording/reproducing apparatus.

DESCRIPTION OF EMBODIMENTS

[Glass]

The glass A and the glass B can be a glass for a magnetic recording medium substrate or a glass for a glass spacer for a magnetic recording/reproducing apparatus, and can be an amorphous glass. Amorphous glass refers to glass that, unlike crystallized glass, substantially does not contain a crystal phase and exhibits a glass transition phenomenon in response to an increase in temperature.

Furthermore, the above-described glass may be an amorphous oxide glass. Oxide glass is glass in which a main network-forming component is an oxide.

Hereinafter, the above-described glass will be described in more detail.

Hereinafter, the glass A and the glass B will be described in more detail. The description regarding the glass A is applicable to the glass B, and the description regarding the glass B is also applicable to the glass A, unless otherwise specified.

A glass composition is denoted by a glass composition based on oxides in the present invention and in this specification. Here, a "glass composition based on oxides" means a glass composition obtained by performing conversion such that all raw glass materials are decomposed in melting and are present as oxides in the glass. The glass composition is denoted on the basis of mole (mol %, mole ratio), unless otherwise specified.

The glass composition in the present invention and this specification can be obtained by, for example, a method such as ICP-AES (Inductively Coupled Plasma-Atomic Emission Spectrometry). ICP-AES is used for quantitative analysis, and the analysis is performed for each of elements. Then, analysis values are converted into expressions based on oxides. Analysis values by means of ICP-AES may include, for example, a measurement error of approximately ±5% of an analysis value. Thus, a value based on oxide expression converted from an analysis value may also include an error of approximately ±5% in a similar manner.

Moreover, in the present invention and this specification, the fact that a constituent component is 0% in content, or is not contained or not introduced denotes that the constituent component is substantially not contained, and that the content of the constituent component is at approximately less than or equal to a level of impurities. "Approximately less than or equal to a level of impurities" means, for example, less than 0.01%.

<Glass A>

(Glass Composition)

From the viewpoint of improving heat resistance, the total content of $Li_2O$, $Na_2O$, $K_2O$, $B_2O_3$, and ZnO ($Li_2O+Na_2O+K_2O+B_2O_3+ZnO$) is 3% or less, preferably 2.8 or less, more preferably 2.6 or less, even more preferably 2.4 or less, further preferably 2.0 or less, still more preferably 1.5 or less, yet more preferably 1.0 or less, further more preferably 0.8 or less, and still more preferably 0.5 or less. The total content of $Li_2O+Na_2O+K_2O+B_2O_3+ZnO$ ($Li_2O+Na_2O+K_2O+B_2O_3+ZnO$) is 0% or more, may also be 0%, 0% or more, 0.1% or more, 0.2% or more, or 0.3% or more.

From the viewpoint of improving productivity, specifically, from the viewpoint of enabling continuous use of the same polishing pad for a longer period of time, the mole ratio of the total content of $Al_1O_3$ and MgO relative to the total content of $SiO_2$ and CaO [$(Al_2O_3+MgO)/(SiO_2+CaO)$] is 0.30 or more, is preferably 0.32 or more, more preferably 0.34 or more, even more preferably 0.36 or more, and further preferably 0.38 or more. From the viewpoint of improving glass stability, the mole ratio [$(Al_2O_3+MgO)/(SiO_2+CaO)$] is 0.6 or less, preferably 0.60 or less, more preferably 0.58 or less, even more preferably 0.56 or less, further preferably 0.54 or less, still more preferably 0.52 or less, and yet more preferably 0.50 or less.

From the viewpoint of improving productivity, specifically, from the viewpoint of improving the meltability of glass, the total content of $SiO_2$ and $Al_2O_3$ ($SiO_2+Al_2O_3$) is 85% or less, and preferably 83% or less. Also, from the viewpoint that glass can exhibit viscosity appropriate for molding at the molding temperature suitable for molding glass with good productivity, the total content of $SiO_2$ and $Al_2O_3$ ($SiO_2+Al_2O_3$) is preferably 82% or less, and more preferably 81% or less. Also, from the viewpoint of improving chemical durability, the total content of $SiO_2$ and $Al_2O_3$ ($SiO_2+Al_2O_3$) is 64% or more, preferably 66% or more, more preferably 68% or more, and even more preferably 70% or more.

From the viewpoint of improving heat resistance, the total content of $SiO_2$, $Al_2O_3$, MgO, and CaO ($SiO_2+Al_2O_3+MgO+CaO$) is 87% or more. From the viewpoint of improving glass stability and reducing the specific gravity of glass, the total content ($SiO_2+Al_2O_3+MgO+CaO$) is also preferably 87% or more. From the above viewpoints, the total content ($SiO_2+Al_2O_3+MgO+CaO$) is preferably 89% or more, more preferably 91% or more, and even more preferably 93% or more. Also, from the viewpoint of improving glass stability, the total content ($SiO_2+Al_2O_3+MgO+CaO$) is 98% or less, more preferably 97% or less, and even more preferably 96% or less.

$SiO_2$ is a network-forming component in glass. From the viewpoint of further improving glass stability, the $SiO_2$ content is preferably 55% or more, more preferably 57% or more, and even more preferably 59% or more. Furthermore, from the viewpoint of further improving productivity, specifically, from the viewpoint of further improving the meltability of glass, the $SiO_2$ content is preferably 66% or less, more preferably 64% or less, and even more preferably 63% or less.

$B_2O_3$ is also a network-forming component in glass. The $B_2O_3$ content may be 0% or more, may also be 0%, or may also be more than 0%. $B_2O_3$ soon volatilizes when glass is melted and tends to destabilize the glass component ratio. Also, excessive introduction thereof is likely to reduce chemical durability. From the above viewpoints, the $B_2O_3$ content may be 3% or less, for example, is preferably 2% or less, more preferably 1% or less, and even more preferably 0%.

From the viewpoint of further improving heat resistance, the $Al_2O_3$ content is preferably 10% or more, more preferably 11% or more, and even more preferably 12% or more. Furthermore, from the viewpoint of further improving glass stability, the $Al_2O_3$ content is preferably 18% or less, more preferably 17% or less, and even more preferably 16% or less.

The $P_2O_5$ content may be 0% or more, may also be 0%, or may also be more than 0%. From the viewpoint of further improving glass stability, the $P_2O_5$ content is preferably 1% or less, more preferably 0.5% or less, and even more preferably 0.3% or less.

From the viewpoint of improving glass rigidity, and from the viewpoint of increasing the Young's modulus, for example, the MgO content is preferably 8% or more, more preferably 9% or more, even more preferably 10% or more, and further preferably 12% or more. From the viewpoint of further improving glass stability, the MgO content is preferably 20% or less, more preferably 19% or less, and even more preferably 18% or less.

The CaO content may be 0% or more, may also be 0%, or may also be more than 0%. From the viewpoint of further improving glass stability, the CaO content is preferably more than 0%, more preferably 0.5% or more, even more preferably 1% or more, further preferably 1.5% or more, and still more preferably 2% or more. Also, from the viewpoint of further improving productivity, specifically, from the viewpoint of enabling continuous use of the same polishing pad for a longer period of time, the CaO content is preferably 7% or less, more preferably 6% or less, and even more preferably 5% or less.

From the viewpoint of further improving glass stability, the total content of $Al_2O_3$, MgO, and CaO ($Al_2O_3$+MgO+CaO) is preferably 38% or less, more preferably 35% or less, and even more preferably 34% or less. From the viewpoint of improving glass rigidity, and from the viewpoint of improving the Young's modulus, for example, the total content ($Al_2O_3$+MgO+CaO) is preferably 26% or more, more preferably 28% or more, and even more preferably 30% or more.

The BaO content may also be 0% or more, may also be 0%, may also be more than 0%, may also be 0.5% or more, or 1% or more. From the viewpoint of reducing the specific gravity of glass, the BaO content is preferably 3% or less, more preferably 2.5% or less, and even more preferably 2% or less.

The SrO content may also be 0% or more, may also be 0%, and may also be more than 0%, and from the viewpoint of further improving glass stability, the SrO content is preferably more than 0%, more preferably 0.5% or more, and even more preferably 1% or more. From the viewpoint of further reducing the specific gravity of glass, the SrO content is preferably 5% or less, more preferably 4.5% or less, even more preferably 4% or less, further preferably 3.5% or less, and still more preferably 3% or less.

The mole ratio of the CaO content relative to the total content of MgO, CaO, SrO, and BaO [CaO/(MgO+CaO+SrO+BaO)] may be 0, and may also be more than 0. From the viewpoint of further improving glass stability, the mole ratio [CaO/(MgO+CaO+SrO+BaO)] is preferably more than 0.

Also, from the viewpoint of further improving productivity, specifically, from the viewpoint of enabling continuous use of the same polishing pad for a longer period of time, the mole ratio [CaO/(MgO+CaO+SrO+BaO)] is preferably 0.36 or less, more preferably 0.34 or less, even more preferably 0.32 or less, further more preferably 0.30 or less, and still more preferably 0.28 or less.

The ZnO content may also be 0% or more, may also be 0%, may also be more than 0%, may also be 0.5% or more, or 1% or more. From the viewpoint of further improving glass stability, the ZnO content is preferably 2% or less, more preferably 1.5% or less, and even more preferably 1% or less.

The total content of ZnO and BaO (ZnO+BaO) may also be 0%, may also be more than 0%, may also be 0.5% or more, or 1% or more. From the viewpoint of reducing the specific gravity of glass, the total content (ZnO+BaO) is preferably 2.5% or less, more preferably 2.3% or less, and even more preferably 2.0% or less.

The $ZrO_2$ content may also be 0% or more, may also be 0%, may also be more than 0%, may also be 0.5% or more, or 1% or more. From the viewpoint of further improving glass stability, the $ZrO_2$ content is preferably 4% or less, more preferably 3.5% or less, even more preferably 3% or less, further preferably 2.5% or less, and still more preferably 2% or less.

The $Li_2O$ content may also be 0% or more, may also be 0%, and may also be more than 0%. From the viewpoint of further improving heat resistance, the $Li_2O$ content is preferably 3% or less, more preferably 2% or less, even more preferably 1% or less, further preferably 0.5% or less, and still more preferably 0.3% or less.

The $Na_2O$ content may also be 0% or more, may also be 0%, and may also be more than 0%. Also, the $Na_2O$ content may also be 3% or less, may also be 2.5% or less, and may also be 2% or less.

The $K_2O$ content may also be 0% or more, may also be 0%, or may also be more than 0%. Also, the $K_2O$ content may be 3% or less, may also be 2.5% or less, and may also be 2% or less.

From the viewpoint of further improving heat resistance, a mole ratio of the total content of MgO, CaO, $Li_2O$, $Na_2O$, and $K_2O$ relative to the $Al_2O_3$ content [(MgO+CaO+$Li_2O$+$Na_2O$+$K_2O$)/$Al_2O_3$] is preferably 2 or less, more preferably 1.7 or less, and even more preferably 1.5 or less. From the viewpoint of further improving productivity, specifically, from the viewpoint of further improving the meltability of glass, the mole ratio [(MgO+CaO+$Li_2O$+$Na_2O$+$K_2O$)/$Al_2O_3$] is preferably 0.8 or more, more preferably 1.0 or more, and even more preferably 1.2 or more.

The $TiO_2$ content may also be 0% or more, may also be 0%, may also be more than 0%, may also be 0.5% or more, or 1% or more. From the viewpoint of further improving glass stability, the $TiO_2$ content is preferably 5% or less, more preferably 4.5% or less, even more preferably 4% or less, further preferably 3.5% or less, still more preferably 3% or less, yet more preferably 2.5% or less, and further more preferably 2% or less.

The total content of $TiO_2$ and $ZrO_2$ ($TiO_2$ and $ZrO_2$) may also be 0% and may also be more than 0%, and from the viewpoint of improving glass rigidity, and from the viewpoint of increasing the Young's modulus, for example, the total content ($TiO_2$ and $ZrO_2$) is preferably more than 0%, more preferably 0.5% or more, even more preferably 1% or more, and further preferably 2% or more. From the viewpoint of reducing the specific gravity of glass, the total content ($TiO_2$ and $ZrO_2$) is preferably 6% or less, more preferably 5% or less, even more preferably 4% or less, and further preferably 3% or less.

From the viewpoint of improving glass stability, the mole ratio of the $TiO_2$ content relative to the total content of $Al_2O_3$, $ZrO_2$, and SrO [$TiO_2$/($Al_2O_3$+$ZrO_2$+SrO)] is preferably 0.15 or less, more preferably 0.1 or less, even more preferably 0.5 or less, further preferably 0.1 or less, and still more preferably 0.08 or less. The mole ratio [$TiO_2$/($Al_2O_3$+$ZrO_2$+SrO)] may also be 0 or more, may also be 0, and may also be more than 0, and from the viewpoint of further improving productivity, specifically, from the viewpoint of further improving the meltability of glass, the mole ratio [$TiO_2$/($Al_2O_3$+$ZrO_2$+SrO)] is preferably more than 0, more preferably 0.01 or more, and even more preferably 0.03 or more.

The total content of $B_2O_3$, SrO, $TiO_2$, and $ZrO_2$ ($B_2O_3$+SrO+$TiO_2$+$ZrO_2$) may also be 0%, may also be more than 0%, may also be 0.5% or more, or 1% or more. From the viewpoint of further improving glass stability, the total content ($B_2O_3$+SrO+$TiO_2$+$ZrO_2$) is preferably 7% or less, more preferably 6.5% or less, even more preferably 6% or less, and further preferably 5.5% or less.

From the viewpoint of further reducing the specific gravity of glass, the PbO content is preferably 0.5% or less, more preferably 0.3% or less, and even more preferably 0.1% or less. The PbO content may also be 0% or more, and may also be 0%. PbO is a substance that adversely affects the environment, and thus the content thereof is preferably reduced, or the introduction of this substance is preferably avoided (i.e., the content thereof is preferably set to 0%). Cd and As are also substances that adversely affect the environment, and the introduction of these substances is preferably avoided.

From the viewpoint of obtaining a clarifying effect, the above glass may contain one or more selected from the group consisting of $SnO_2$, $CeO_2$, and $Sb_2O_3$.

$SnO_2$ serves to promote clarification in a state where the melting temperature of glass is comparatively high (a temperature range of approximately 1400° C. to 1600° C.). The $SnO_2$ content may also be 0% or more, may also be 0%, and may also be more than 0%. In a circumstance where use of a clarifying agent such as $Sb_2O_3$ and arsenious acid, which adversely affect the environment, is limited, in an embodiment, the introduction of $SnO_2$ into the glass A is preferable for removing bubbles in glass having a high melting temperature. From the viewpoint of obtaining a clarifying effect, the $SnO_2$ content is preferably 0.01% or more, more preferably 0.05% or more, even more preferably 0.10% or more, further preferably 0.15% or more, and still more preferably 0.20% or more. Also, from the viewpoint of reducing the specific gravity of glass, the $SnO_2$ content is preferably 2% or less, more preferably 1.5% or less, even more preferably 1% or less, further preferably 0.8% or less, and still more preferably 0.5% or less.

$CeO_2$ is also a component that exhibits a glass clarification action. The $CeO_2$ content may also be 0% or more, may also be 0%, and may also be more than 0%. $CeO_2$ serves to take in oxygen and fix it as a glass component in a state where the melting temperature of glass is comparatively low (a temperature range of approximately 1200° C. to 1400° C.), and, in an embodiment, it is preferable to introduce $CeO_2$ into the above glass as a clarifying agent. From the viewpoint of obtaining a clarifying effect, the $CeO_2$ content is preferably 0.01% or more, more preferably 0.05% or more, even more preferably 0.08% or more, and further preferably 0.10% or more. Also, from the viewpoint of reducing the specific gravity of glass, the $CeO_2$ content is preferably 2% or less, more preferably 1.5% or less, even more preferably 1% or less, further preferably 0.8% or less, still more preferably 0.5% or less, and yet more preferably 0.3% or less. As a consequence of allowing $SnO_2$ and $CeO_2$ to coexist, a clarification action in a wide temperature range can be obtained, and thus, in an embodiment, the above glass preferably contains both $SnO_2$ and $CeO_2$.

From the viewpoint of reducing the environmental impact, it is desirable to refrain from using $Sb_2O_3$. The $Sb_2O_3$ content ranges preferably from 0% to 0.5%. The $Sb_2O_3$ content is more preferably 0.3% or less, even more preferably 0.1% or less, further preferably 0.05% or less, and still more preferably 0.02% or less, and particularly preferably no $Sb_2O$ is contained (the $Sb_2O$ content is 0%).

The $Fe_2O_3$ content may also be 0% or more, may also be 0%, and may also be more than 0%. It is preferable to add $Fe_2O_3$ to glass from the viewpoint of improving heat absorption efficiency during heating. From the viewpoint of improving productivity, a magnetic recording medium substrate made of a glass having high heat absorption efficiency during heating is preferable because it can contribute to improving heating efficiency during heating performed when and/or after a magnetic layer is formed in a process for manufacturing a magnetic recording medium, for example. From the viewpoint of further improving glass stability, the $Fe_2O_3$ content is preferably 1% or less, more preferably 0.5% or less, even more preferably 0.1% or less, and further preferably 0.05% or less. Note that the $Fe_2O_3$ content is expressed as an outer percentage. That is, the $Fe_2O_3$ content is represented by a mole percentage of the amount of $Fe_2O_3$ contained in the glass with respect to 100% where the total content of the glass components other than $Fe_2O_3$ (the total content of the glass components and additives when the glass contains additives in addition to the glass components) is 100%.

(Physical Properties of Glass)

Glass Transition Temperature

As described above, magnetic recording medium substrates are usually subjected to high temperature treatment in a step for forming a magnetic recording layer on a substrate. In order to form a magnetic recording layer containing a magnetic material with high magnetic anisotropy energy, which has been developed recently for high-density recording with a magnetic recording medium, for example, usually, film formation is performed at high temperatures or heat treatment is performed at high temperatures after film formation. If a magnetic recording medium substrate does not have heat resistance capable of withstanding such high temperature treatment, the flatness of the substrate exposed to high temperatures in high temperature treatment will be impaired. In contrast, the glass A has the above glass composition and thus can exhibit high heat resistance. The glass transition temperature Tg (hereinafter, also referred to as "Tg"), which is an indicator related to heat resistance, of the glass A is preferably 740° C. or more, more preferably 750° C. or more, even more preferably 760° C. or more, and further preferably 770° C. or more. Also, the Tg of the glass A is, for example, 850° C. or less, and may be 830° C. or less, or 810° C. or less. However, a higher Tg is more preferable from the viewpoint of heat resistance, and thus the Tg thereof is not particularly limited to the above-mentioned values.

Young's Modulus

Accompanying a reduction in the thickness of a magnetic recording medium and an increase in recording density thereof, there is also demand for further reduction of warpage and deflection of a magnetic recording medium while a spindle motor is rotating, and the practical strength of a magnetic recording medium. In order to meet this demand, it is desired that the glass for a magnetic recording medium substrate has high rigidity, and specifically, has a high Young's modulus. With respect to this point, the Young's modulus of the glass A is preferably 86 GPa or more. According to a glass for a magnetic recording medium substrate having high rigidity represented by a Young's modulus of 86 GPa or more, it is possible to inhibit the deformation of a substrate while a spindle motor is rotating, and thus it is also possible to inhibit warpage and deflection of a magnetic recording medium accompanying deformation of the substrate. The Young's modulus of the glass A is preferably 88 GPa or more, more preferably 90 GPa or more, even more preferably 92 GPa or more, and further preferably 94 GPa or more. The Young's modulus of the glass A may be 120 GPa or less, 110 GPa or less, or 100 GPa or less, for example. However, a higher Young's modulus means higher rigidity, which is more preferable, and thus the Young's modulus of the glass A is not limited to the above-mentioned values.

Specific Gravity

The specific gravity of the glass A is preferably 2.8 or less. The specific gravity of the glass A is more preferably 2.80 or less, even more preferably 2.78 or less, further preferably 2.76 or less, still more preferably 2.74 or less, yet more preferably 2.72 or less, and further more preferably 2.70 or less. As a consequence of a reduction in the specific gravity of a glass for a magnetic recording medium substrate, the weight of a magnetic recording medium substrate and furthermore the weight of a magnetic recording medium can be reduced, and consequently suppression of power consumption of a magnetic recording/reproducing apparatus (usually referred to as an "HDD") becomes possible. The specific gravity of the glass A is, for example, 2.40 or more. However, a lower specific gravity is preferable, and thus the specific gravity of the glass A is not limited to the above-mentioned values.

Specific Elastic Modulus

A specific elastic modulus is obtained by dividing the Young's modulus of glass by the density thereof. Here, density can be considered as a value obtained by giving the unit $g/cm^3$ to the specific gravity of glass. From the viewpoint of providing a substrate that is less likely to deform, the specific elastic modulus of the glass A is preferably 30 MNm/kg or more, more preferably 32 MNm/kg or more, even more preferably 33 MNm/kg or more, further preferably 34 MNm/kg or more, and still more preferably 35 MNm/kg or more. The specific elastic modulus of the glass A is, for example, 40 MNm/kg or less. However, a higher specific elastic modulus is more preferable, and thus the specific elastic modulus of the glass A is not limited to the above-mentioned values.

Thermal Expansion Coefficient

An HDD with a built-in magnetic recording medium usually has a structure in which the center portion is pressed down by a spindle of a spindle motor and a clamp, and the magnetic recording medium itself is rotated. Thus, when there is a large difference between respective thermal expansion coefficients of a magnetic recording medium substrate and a spindle material constituting the spindle portion, deviation occurs during use between thermal expansion/thermal contraction of the spindle and thermal expansion/thermal contraction of the magnetic recording medium substrate relative to ambient temperature changes. As a result, a phenomenon in which the magnetic recording medium deforms will occur. When such a phenomenon occurs, a head cannot read written information, causing deterioration of the reliability of recording/reproduction. Therefore, there is a desire to avoid an excessive increase in the difference between the thermal expansion coefficient of the glass for a magnetic recording medium substrate and the thermal expansion coefficient of the spindle material (e.g., stainless steel, for example). Generally, a spindle material for HDDs has an average linear expansion coefficient (thermal expansion coefficient) of $70 \times 10^{-7}/°$ C. or more within a temperature range of $100°$ C. to $300°$ C., and in a case where the average linear expansion coefficient of a glass for a magnetic recording medium substrate at $100°$ C. to $300°$ C. is $30 \times 10^{-7}/°$ C. or more, the difference between the thermal expansion coefficient of the glass and that of a spindle material is small, and thus the glass for a magnetic recording medium substrate can contribute to improving the reliability of the magnetic recording medium. The average linear expansion coefficient (hereinafter, also referred to as "a") of the glass A at $100°$ C. to $300°$ C. is preferably $34 \times 10^{-7}/°$ C. or more, more preferably $35 \times 10^{-7}/°$ C. or more, even more preferably $36 \times 10^{-7}/°$ C. or more, further preferably $37 \times 10^{-7}/°$ C. or more, still more preferably $38 \times 10^{-7}/°$ C. or more, and yet more preferably $39 \times 10^{-7}/°$ C. or more. Also, the average linear expansion coefficient (a) of the glass A at $100°$ C. to $300°$ C. is preferably $70 \times 10^{-7}/°$ C. or less, more preferably $68 \times 10^{-7}/°$ C. or less, even more preferably $65 \times 10^{-7}/°$ C. or less, further preferably $63 \times 10^{-7}/°$ C. or less, still more preferably $60 \times 10^{-7}/°$ C. or less, and yet more preferably $57 \times 10^{-7}/°$ C. or less.

Glass Stability

Preferably, the glass A can exhibit high glass stability. Methods for evaluating glass stability may include a $1300°$ C. and 16 hour holding test, a $1270°$ C. and 16 hour holding test, or a $1250°$ C. and 16 hour holding test, which will be described later in detail. Preferably, an evaluation result of A or B is given in at least one of the $1300°$ C. and 16 hour holding test, the $1270°$ C. and 16 hour holding test, and the $1250°$ C. and 16 hour holding test, and more preferably an evaluation result of A is given in at least one of these. It can be said that glasses that achieve better results in holding tests at lower holding temperatures have higher glass stability.

<Glass B>

(Glass Composition)

In the glass B, the mole ratio of the total content of $Al_2O_3$ and MgO relative to the total content of $SiO_2$ and CaO $[(Al_2O_3+MgO)/(SiO_2+CaO)]$ is in a range of 0.30 or more and 0.6 or less. With regard to details of the mole ratio $[(Al_2O_3+MgO)/(SiO_2+CaO)]$ of the glass B, the above description regarding the glass A can be referred to.

The total content of $SiO_2$ and $Al_2O_3$ ($SiO_2+Al_2O_3$) in the glass B is in a range of 64 mol % or more and 85 mol % or less. With regard to details of the total content ($SiO_2+Al_2O_3$) in the glass B, the above description regarding the glass A can be referred to.

The total content of $SiO_2$, $Al_2O_3$, MgO, and CaO ($SiO_2+Al_2O_3+MgO+CaO$) in the glass B is in a range of 87 mol % or more and 98 mol % or less. With regard to details of the total content ($SiO_2+Al_2O_3+MgO+CaO$) in the glass B, the above description regarding the glass A can be referred to.

In the glass B, the total content of $Li_2O$, $Na_2O$, $K_2O$, $B_2O_3$, and ZnO ($Li_2O+Na_2O+K_2O+B_2O_3+ZnO$) is in a range of 0 mol % or more and 3 mol % or less. With regard to details of the total content ($Li_2O+Na_2O+K_2O+B_2O_3+ZnO$) in the glass B, the above description regarding the glass A can be referred to.

With regard to other details of the glass composition of the glass B, the above description regarding the glass A can be referred to.

(Physical Properties of Glass)

The glass B has a glass transition temperature of $740°$ C. or more. With regard to details of the glass transition temperature of the glass B, the above description regarding the glass A can be referred to.

Also, with regard to other details regarding the physical properties of glass, the above description regarding the glass A can be referred to.

The glass A and the glass B can be produced by weighing and blending raw glass materials such as oxides, carbonates, nitrates, sulfates, and hydroxides so as to give respective predetermined glass compositions, by sufficiently mixing these materials, heating and melting the resulting mixtures within a range of, for example, $1400°$ C. to $1600°$ C. in a melting vessel, and by molding the respective homogenized molten glasses that have been subjected to clarification and stirring to cause sufficient bubble separation. It is preferable to heat and melt raw glass materials in a melting tank at $1400°$ C. to $1550°$ C., to raise the temperature of the obtained molten glass in a clarification tank and hold the glass at $1450°$ C. to $1600°$ C., and after that to lower the temperature and allow glass to flow out at $1200°$ C. to $1400°$ C. to be molded, for example. With regard to the meltability of glass, the smaller the amount of raw material residue due to melting at a given melting temperature is, the more favorable the meltability is. From the viewpoint of productivity, a glass with high meltability is preferable because it can be melted homogeneously at a lower temperature or in a shorter period of time.

[Magnetic Recording Medium Substrate]

A magnetic recording medium substrate (hereinafter, also referred to as "magnetic recording medium substrate a") according to an aspect of the present invention is comprised of the glass A.

Also, a magnetic recording medium substrate (hereinafter, also referred to as "magnetic recording medium substrate b") according to another aspect of the present invention is comprised of the glass B.

Magnetic recording medium substrates can be manufactured through processes for heating raw glass materials to thereby prepare molten glass, for molding the molten glass into a plate shape by any one of a press molding method, a down-draw method, and a float method, and for processing the obtained plate-shaped glass. In a press molding method, molten glass flowing out from a glass outflow pipe is cut to a predetermined volume to give an intended molten glass lump, which is press-molded with a press molding die to thereby produce a thin-walled disk-shaped substrate blank, for example. Subsequently, a center hole is formed in the obtained substrate, and subjected to outer/inner circumference processing and polishing processing such as lapping and polishing for both main surfaces. Subsequently, a disk-shaped substrate can be obtained through cleaning processes including acid cleaning and alkali cleaning. Known techniques related to the manufacturing of magnetic recording medium substrates can be applied to various processes performed in order to obtain the above magnetic recording medium substrate. In a polishing process, usually, a polishing agent (slurry) is supplied between a glass to be polished and polishing pads, and the glass is polished. However, if foreign matter (e.g., sludge-like foreign matter) formed through a reaction between glass components and the polishing agent adheres to and accumulates on the polishing pads, the polishing efficiency (polishing rate) in the polishing process will decrease. Therefore, if a polishing pad ceases to achieve a predetermined polishing efficiency, it is common practice to replace the polishing pad. It can be said that, from the viewpoint of productivity, the longer period of time the same polishing pad can be continuously used, the higher the productivity is.

In the above magnetic recording medium substrate, in an aspect, the surface composition and internal composition thereof are homogeneous. Here, "the surface composition and internal composition thereof are homogeneous" means that no ion exchange has been performed (that is, an ion-exchange layer is not contained). A magnetic recording medium substrate that does not have an ion-exchange layer is manufactured without performing ion exchange treatment, and thus it is possible to significantly reduce manufacturing costs.

Also, in an aspect, the above-described magnetic recording medium substrate has an ion-exchange layer on a part of or on the entirety of the surface. An ion-exchange layer exhibits compression stress, and thus the presence or absence of an ion-exchange layer can be confirmed by fracturing the substrate perpendicularly to a main surface and obtaining a stress profile by the Babinet method in the fracture surface. A "main surface" is a surface of a substrate on which a magnetic recording layer is to be provided or has been provided. This surface is a surface having the largest area among surfaces of a magnetic recording medium substrate, and thus is referred to as a main surface. In a case of a disk-shaped magnetic recording medium, the main surface corresponds to a circular surface (if there is a center hole, the center hole is excluded) of the disk. The presence or absence of an ion-exchange layer can be confirmed also by a method or the like for measuring concentration distribution of alkali metal ions in the depth direction from the substrate surface.

An ion-exchange layer can be formed by bring an alkali salt into contact with a substrate surface under high temperatures and exchanging an alkali metal ion in the alkali salt for an alkali metal ion in the substrate. Known techniques can be applied to ion exchange (also referred to as a "strengthening treatment" or "chemical strengthening"), and as an example, paragraphs 0068 and 0069 in WO 2011/019010A1 can be referred to.

The thickness of the above-described magnetic recording medium substrate is 1.5 mm or less, for example, preferably 1.2 mm or less, more preferably 1.0 mm or less, even more preferably 0.8 mm or less, further preferably less than 0.8 mm, still more preferably 0.7 mm or less, and yet more preferably 0.6 mm or less. Furthermore, the thickness of the above-described magnetic recording medium substrate is 0.3 mm or more, for example. From the viewpoint of improving the storage capacity of an HDD, it is preferable that the thickness of a magnetic recording medium substrate can be reduced. Furthermore, the above-described magnetic recording medium substrate preferably has a disk shape having a center hole.

The above magnetic recording medium substrate may be comprised of an amorphous glass. Amorphous glass can realize good surface smoothness when it is processed into a substrate, as compared with crystallized glass.

The above magnetic recording medium substrate is made of the glass for a magnetic recording medium substrate according to an aspect of the present invention, and thus can have the above-mentioned physical properties of the above glass.

[Magnetic Recording Medium]

An aspect of the present invention relates to a magnetic recording medium having a magnetic recording layer on the above magnetic recording medium substrate.

A magnetic recording medium is referred to as a magnetic disk, hard disk, or the like, and is suitable for various magnetic recording/reproducing apparatuses, such as: internal memories (such as fixed disk) for desktop personal computers, computers for servers, notebook computers, and mobile personal computers; internal memories for portable recording/reproducing apparatuses for recording and reproducing images and/or voices; and recording/reproducing devices for in-vehicle audio devices. In the present invention and this specification, a "magnetic recording/reproducing apparatus" means an apparatus capable of performing one of or both of magnetic recording of information and magnetic reproduction of information.

A magnetic recording medium has a configuration in which, for example, at least an adhesive layer, an undercoat layer, a magnetic layer (magnetic recording layer), a protective layer, and a lubricating layer are stacked, in that order from a main surface, on the main surface of a magnetic recording medium substrate.

A magnetic recording medium substrate is introduced into an evacuated film formation apparatus, and sequential film formation from the adhesive layer to the magnetic layer is performed over the main surface of a magnetic recording medium substrate by a DC (Direct Current) magnetron sputtering process in an Ar atmosphere, for example. CrTi can be used for the adhesive layer, for example, and a material containing Ru or MgO can be used for the undercoat layer, for example. Note that a soft magnetic layer or a heat sink layer may also be added as appropriate. After the above-described film formation, for example, by a CVD (Chemical Vapor Deposition) process, the protective layer is formed using $C_2H_4$, which is subjected to a nitriding treatment of introducing nitrogen to the surface in the same chamber to thereby be able to form a magnetic recording medium. Thereafter, for example, applying PFPE (polyfluoropolyether) onto the protective layer by a dip coat method makes it possible to form the lubricating layer.

In order to achieve further higher density recording with a magnetic recording medium, a magnetic recording layer preferably contains a magnetic material with high magnetic anisotropy energy. Magnetic materials preferable from this viewpoint can include Fe—Pt-based magnetic materials and Co—Pt-based magnetic materials. Note that, here, "-based" means inclusion. Namely, the above-described magnetic recording medium preferably has a magnetic recording layer containing Fe and Pt, or Co and Pt, as the magnetic recording layer. With respect to a magnetic recording layer containing these magnetic materials and to a film formation method thereof, descriptions in paragraph 0074 in WO 2011/019010A1, and Examples in this publication can be referred to. Furthermore, a magnetic recording medium having such a magnetic recording layer is preferably applied to a magnetic recording apparatus by a recording system referred to as an energy-assisted recording system. Among energy-assisted recording systems, a recording system in which magnetization reversal is assisted by irradiation with near-field light or the like is referred to as a heat-assisted recording system, and a recording system in which magnetization reversal is assisted by microwaves is referred to as a microwave-assisted recording system. With respect to details of these, paragraph 0075 in WO 2011/019010A1 can be referred to. Note that a conventional CoPtCr-based material may be used as a magnetic material for forming a magnetic recording layer.

Incidentally, in recent years, a significant reduction in a gap between a recording/reproducing element portion of a magnetic head and a surface of a magnetic recording medium (low floating amount) is achieved by mounting a DFH (Dynamic Flying Height) mechanism on a magnetic head, and thereby the achievement of further higher recording density is realized. The DFH mechanism is a function that causes only the vicinity of a recording/reproducing element portion to project in the medium surface direction, by providing a heating portion such as a micro heater near the element portion of a magnetic head. Consequently, the distance (flying height) between the magnetic head and the magnetic recording layer of a medium becomes smaller, thus making it possible to pick out signals from smaller magnetic particles and to achieve further higher recording density. In an embodiment, the magnetic recording medium substrate can be used as a substrate of a magnetic recording medium that is to be applied to a magnetic recording/reproducing apparatus provided with a magnetic head having a DFH mechanism.

There is no particular limitation regarding the dimensions of both of the above-described magnetic recording medium substrate (e.g., magnetic-disk glass substrate) and magnetic recording medium (e.g., magnetic disk), and, for example, the medium and substrate can also be downsized because higher recording density is possible. Also, it is possible to increase the size of the medium and the substrate in order to increase storage capacity per magnetic recording medium. They can have a nominal diameter of, naturally, 2.5 inches, a smaller diameter (e.g., 1 inch, 1.8 inches), 3 inches, 3.5 inches, or have a dimension larger than 3.5 inches, for example.

[Glass Spacer for Magnetic Recording/Reproducing Apparatus]

A glass spacer for a magnetic recording/reproducing apparatus (hereinafter, also referred to as "glass spacer a") according to an aspect of the present invention is comprised of the glass A.

A glass spacer (hereinafter, also referred to as "glass spacer b") according to another aspect of the present invention is comprised of the glass B.

A magnetic recording medium can be used for magnetically recording and/or reproducing information in a magnetic recording/reproducing apparatus. A magnetic recording/reproducing apparatus is usually provided with a spacer for fixing a magnetic recording medium to a spindle of a spindle motor and/or for keeping a distance between a plurality of magnetic recording media. In recent years, the use of a glass spacer as the spacer in this manner has been proposed. For reasons similar to the reasons described in detail regarding a glass for a magnetic recording medium substrate, it is also desirable that this glass spacer has high heat resistance and productivity. To address this, glass having the above composition is suitable as a glass spacer for a magnetic recording/reproducing apparatus since the above-described glass can have high heat resistance and productivity.

A spacer for a magnetic recording/reproducing apparatus is a ring-shaped member, and details of a configuration of the glass spacer, a method for manufacturing the glass spacer, and the like are known. Furthermore, with respect to a method for manufacturing a glass spacer, the above description about a method for manufacturing a glass for a magnetic recording medium substrate and a method for manufacturing a magnetic recording medium substrate can also be referred to. Furthermore, with regard to other details of a glass composition, glass physical properties, and the like of the glass spacer a, the above description regarding the glass A, the magnetic recording medium substrate made of the glass A, and the magnetic recording medium having this magnetic recording medium substrate can be referred to. With regard to other details of a glass composition, glass physical properties, and the like of the glass spacer b, the above description regarding the glass B, the magnetic recording medium substrate made of the glass B, and the magnetic recording medium having this magnetic recording medium substrate can be referred to.

Note that the spacer for a magnetic recording/reproducing apparatus can be constituted by the glass spacer a or the glass spacer b, or may also have a configuration in which one or more films such as conductive films are formed on a surface of the glass spacer a or the glass spacer b. In order to eliminate static electricity generated while a magnetic recording medium rotates, a conductive film such as an NiP alloy film can also be formed on the surface of a glass spacer through plating, or using an immersion method, a vapor deposition method, a sputtering method, or the like. Also, the surface smoothness of a glass spacer can be enhanced through polishing processing (for example, the average surface roughness Ra is 1 μm or less), which can increase adhesion between a magnetic recording medium and a spacer to thereby inhibit the occurrence of positional displacement.

[Magnetic Recording/Reproducing Apparatus]

An aspect of the present invention relates to a magnetic recording/reproducing apparatus that includes one or more selected from the group consisting of:

a magnetic recording medium a;

a magnetic recording medium b;

a glass spacer a; and a glass spacer b.

A magnetic recording/reproducing apparatus includes at least one magnetic recording medium and at least one spacer, and further includes usually a spindle motor for rotationally driving the magnetic recording medium, and at least one magnetic head for performing recording and/or reproduction of information to the magnetic recording medium.

The above-described magnetic recording/reproducing apparatus according to an aspect of the present invention can include, as at least one magnetic recording medium, the magnetic recording medium (magnetic recording medium a and/or magnetic recording medium b) according to an aspect of the present invention, and can also include a plurality of the magnetic recording media according to an aspect of the present invention. The above-described magnetic recording/reproducing apparatus according to an aspect of the present invention can include, as at least one spacer, the glass spacer (glass spacer a and/or glass spacer b) according to an aspect of the present invention, and can also include a plurality of the glass spacers according to an aspect of the present invention. A small difference between the thermal expansion coefficient of a magnetic recording medium and the thermal expansion coefficient of a spacer is preferable from the viewpoint of inhibiting the occurrence of phenomena that may arise due to the difference between thermal expansion coefficients of the two, for example, distortion of a magnetic recording medium and impairment of stability during rotation due to positional displacement of a magnetic recording medium. From this viewpoint, it is preferable that the magnetic recording/reproducing apparatus according to an aspect of the present invention includes: the magnetic recording medium according to an aspect of the present invention, as at least one magnetic recording medium, and as more magnetic recording media in a case where a plurality of magnetic recording media are to be included; and includes: the glass spacer according to an aspect of the present invention, as at least one spacer, and as more spacers in a case where a plurality of spacers are to be included. Furthermore, for example, the magnetic recording/reproducing apparatus according to an aspect of the present invention can be one in which the glass constituting the magnetic recording medium substrate contained in the magnetic recording medium and the glass constituting the glass spacer have the same glass composition.

The magnetic recording/reproducing apparatus according to an aspect of the present invention may be one that contains at least one of the magnetic recording medium according to an aspect of the present invention and the glass spacer according to an aspect of the present invention. Known techniques related to magnetic recording/reproducing apparatuses can be applied to other points. In an aspect, it is possible to use, as a magnetic head, an energy-assisted magnetic recording head having: an energy source (for example, heat source such as a laser light source, microwaves, and the like) for assisting magnetization reversal (assisting writing of magnetic signals); a recording element portion; and a reproducing element portion. The magnetic recording/reproducing apparatus, as described above, using an energy-assisted recording system that includes the energy-assisted magnetic recording head is useful as a magnetic recording/reproducing apparatus having high recording density and high reliability. Furthermore, when manufacturing a magnetic recording medium used for a magnetic recording/reproducing apparatus of an energy-assisted recording system such as a heat-assisted magnetic recording system provided with a heat-assisted magnetic recording head having a laser light source or the like, sometimes a magnetic recording layer containing a magnetic material with high magnetic anisotropy energy is formed on a magnetic recording medium substrate. In order to form such a magnetic recording layer, film formation is usually performed at high temperatures or heat treatment is performed at high temperatures after film formation. The magnetic recording medium substrate according to an aspect of the present invention is preferable as a magnetic recording medium substrate that may have high heat resistance capable of withstanding such treatment at high temperatures. However, the magnetic recording/reproducing apparatus according to an aspect of the present invention is not limited to an energy-assisted magnetic recording/reproducing apparatus.

EXAMPLES

Hereinafter, the present invention will be described in more detail with reference to Examples. However, the present invention is not limited to embodiments represented in Examples.

Examples No. 1 to No. 71

Raw materials such as oxides, carbonates, nitrates, sulfates, and hydroxides were weighed so as to give glasses with respective compositions as shown in Tables 1 to 4 below, and these materials were then mixed to give respective blended raw materials. Each molten glass obtained by introducing the blended raw material into a melting tank and by heating and melting the same in a range of 1400° C. to 1600° C., was held at 1400° C. to 1550° C. for 6 hours in a clarification tank. Then, the temperature was lowered (temperature decrease) and each molten glass was held in a range of 1200° C. to 1400° C. for 1 hour and was then molded to obtain each glass (amorphous oxide glass) for evaluation described below.

<Evaluation of Physical Properties of Glass>

(1) Glass Transition Temperature (Tg), Average Linear Expansion Coefficient ($\alpha$)

Glass transition temperature Tg, and average linear expansion coefficient $\alpha$ at 100° C. to 300° C. of each glass were measured using a thermomechanical analysis (TMA) apparatus.

(2) Young's Modulus

The Young's modulus of each glass was measured using an ultrasonic method.

(3) Specific Gravity

The specific gravity of each glass was measured using the Archimedes method.

(4) Specific Elastic Modulus

A specific elastic modulus was calculated from the Young's modulus obtained in (2) above and the specific gravity obtained in (3) above.

(5) Glass Stability 100 g of each glass was placed in a platinum crucible, and the crucible was introduced into a heating furnace whose in-furnace temperature was set to 1250° C., 1270° C., or 1300° C., and was then left for 16 hours while the in-furnace temperature was maintained (holding test). After a lapse of 16 hours, the crucible was taken out from the heating furnace, each glass in the crucible was moved onto a refractory and was cooled to room temperature, the presence or absence of crystals of the glass was observed with an optical microscope (magnifying power of 40 to 100), and evaluation was performed according to the criteria below.

A: There are no crystals on the glass surface, in the glass, or at the interface between the glass surface and the bottom portion of the platinum crucible.

B: There are within ten crystals/100 g with a diameter of several tens of micrometers on the glass surface and at the interface between the glass surface and the bottom portion of the platinum crucible.

C: There are at least ten crystals/100 g with a diameter of several tens of micrometers on the glass surface and at the interface between the glass surface and the bottom portion of the platinum crucible.

D: There are crystals in the glass.

E: There are crystals on the glass surface, in the glass, and at the interface between the glass surface and the bottom portion of the platinum crucible.

<Production of Magnetic Recording Medium Substrate>

(1) Production of Substrate Blank

Next, a disk-shaped substrate blank was produced using method A or B below. It is also possible to obtain a glass blank for producing a glass spacer for a magnetic recording/reproducing apparatus, using the same method.

(Method A)

With regard to glasses having the compositions shown in tables below, a clarified and homogenized molten glass was flowed out at a constant flow rate from an outflow pipe and was received with a lower die for press molding, and the molten glass having been flowed out was cut with a cutting blade so that a predetermined amount of molten glass lump was able to be obtained on the lower die. Then, the lower die holding the molten glass lump was immediately taken out from the lower position of the pipe and was press-molded into a thin-walled disk shape having a diameter of 99 mm and a thickness of 0.7 mm, through the use of an upper die facing the lower die and a drum die. The press-molded product was cooled to temperatures not causing the product to change shape, and then it was taken out from the die and annealed to give a substrate blank. Note that, in the above-described molding, a plurality of lower dies were used for molding the molten glass having been flowed out into disk-shaped substrate blanks one after another.

(Method B)

With regard to glasses having compositions shown in the following tables, a clarified and homogenized molten glass was continuously cast from above into a heat resistant mold provided with a tubular through hole via the through hole, and the molten glass was then molded into a round column and was taken out from the lower side of the through hole. The taken-out glass was annealed and was then sliced at fixed intervals in the direction perpendicular to the round columnar axis through the use of a multi wire saw to thereby produce disk-shaped substrate blanks.

Note that, although the above-described methods A and B were employed in this example, methods C and D below are also suitable as a method for manufacturing a disk-shaped substrate blank. Also, methods C and D below are also suitable as a method for manufacturing a glass blank for producing a glass spacer for a magnetic recording/reproducing apparatus.

(Method C)

It is also possible to obtain a substrate blank by: allowing the molten glass to flow out onto a float bath; molding the same into a sheet-shaped glass (molding by a float method); subsequently annealing the same; and then boring a disk-shaped glass from the sheet glass.

(Method D)

It is also possible to obtain a substrate blank by: molding the molten glass into a sheet-shaped glass, using an overflow down-draw method (fusion method); annealing the same; and then boring a disk-shaped glass from the sheet glass.

(2) Production of Glass Substrate

A through hole was made in the center of the substrate blank obtained using each of the above-described methods, and grinding processing was then performed on an outer circumferential surface and an inner circumferential surface of the resulting substrate blank. Then, the main surface of the disk was subjected to lapping and polishing (mirror polishing processing) and thereby the disk was finished into a glass substrate for a magnetic disk, having a diameter of 97 mm and a thickness of 0.5 mm. It is also possible to finish a glass blank for producing a glass spacer for a magnetic recording/reproducing apparatus into a glass spacer for a magnetic recording/reproducing apparatus, using the same method.

The glass substrate obtained in the above was cleaned through the use of a 1.7 mass % aqueous solution of hydrofluorosilicic acid ($H_2SiF$), subsequently through the use of a 1 mass % aqueous solution of potassium hydroxide, and the glass substrate was then rinsed with pure water and dried. In magnification observation of the surface of the substrate produced from the glass in Example, surface roughness and the like were not recognized and the surface was smooth.

With regard to glass with each composition, four or more glass substrates were produced and used for the following evaluation (1), (2), or (3), or for producing the later-described magnetic recording media.

<Evaluation of Productivity>

(1) Evaluation of Meltability (Meltability at 1500° C.)

Raw materials such as oxides, carbonates, nitrates, sulfates, and hydroxides were weighed so as to give glasses with respective compositions as shown in Table 1 below, and these materials were then mixed to give respective blended raw materials. Each blended raw material was introduced into a melting tank, and stirred several times while being heated at 1500° C., and whether or not raw material residue due to melting was present was checked by magnifying and observing the molten substance in the melting tank using a microscope. When raw material residue was not present, the sample was evaluated as "A", and when raw material residue was present, the sample was evaluated as "B".

(2) The Total Amount of Glass Polished by the Time Polishing Pad is Replaced

A through hole was made in the center of the substrate blank obtained using each of the above-described methods, and grinding processing was then performed on an outer circumferential surface and an inner circumferential surface of the resulting substrate blank. Then, the main surface of the disk was subjected to lapping and polishing (mirror polishing processing) using a commercially available polishing agent and polishing pads. An unused polishing pad was continuously used until the polishing efficiency (polishing rate) that is usually accepted in actual production could no longer be maintained (i.e., until replacement was required). The amount (thickness) of glass polished by the time replacement was required was calculated by (the thickness of glass before polishing—the thickness thereof after polishing)×the number of polished glasses, as the "total amount of glasses polished by the time polishing pad is replaced". It can be said that a larger total glass amount is preferable from the viewpoint of productivity because, as the value of the calculated total glass amount increases, the same polishing pad can be continuously used in the polishing process for a longer period of time. The total amount of glass polished by the time the polishing pad is replaced is preferably 300 μm or more, more preferably 500 μm or more, and even more preferably 700 μm or more.

The above results are shown in Tables 1 to 4 (Table 1-1 to Table 4-3).

TABLE 1-1

| Ex. | | $B_2O_3$ | $SiO_2$ | $Al_2O_3$ | MgO | CaO | SrO | BaO | ZnO | $ZrO_2$ |
|---|---|---|---|---|---|---|---|---|---|---|
| 1 | mol % | 0.0 | 62.8 | 14.9 | 17.9 | 0.8 | 1.5 | 0.0 | 0.0 | 1.0 |
| 2 | mol % | 0.0 | 60.4 | 14.4 | 19.6 | 1.1 | 2.0 | 0.0 | 0.0 | 1.3 |
| 3 | mol % | 0.0 | 61.6 | 14.7 | 16.7 | 1.2 | 3.3 | 0.0 | 0.0 | 1.3 |
| 4 | mol % | 0.0 | 61.5 | 14.0 | 16.7 | 1.3 | 3.6 | 0.0 | 0.0 | 1.3 |
| 5 | mol % | 0.0 | 61.8 | 15.5 | 16.5 | 1.5 | 2.0 | 0.0 | 0.0 | 1.0 |
| 6 | mol % | 0.0 | 61.7 | 14.1 | 16.7 | 1.8 | 2.7 | 0.0 | 0.0 | 1.6 |
| 7 | mol % | 0.0 | 61.5 | 14.0 | 16.7 | 1.8 | 3.1 | 0.0 | 0.0 | 1.3 |
| 8 | mol % | 0.0 | 61.7 | 13.9 | 16.7 | 2.0 | 2.7 | 0.0 | 0.0 | 1.4 |
| 9 | mol % | 0.0 | 63.7 | 12.6 | 19.6 | 2.0 | 1.0 | 0.0 | 0.0 | 0.6 |
| 10 | mol % | 0.0 | 61.7 | 14.0 | 16.7 | 2.1 | 2.7 | 0.0 | 0.0 | 1.4 |
| 11 | mol % | 0.0 | 61.8 | 15.5 | 17.0 | 2.3 | 0.7 | 0.0 | 0.0 | 1.0 |
| 12 | mol % | 0.0 | 61.5 | 14.0 | 16.7 | 2.3 | 2.6 | 0.0 | 0.0 | 1.3 |
| 13 | mol % | 1.0 | 60.5 | 14.0 | 16.7 | 2.3 | 2.6 | 0.0 | 0.0 | 1.3 |
| 14 | mol % | 1.7 | 59.5 | 14.0 | 16.7 | 2.6 | 2.6 | 0.0 | 0.0 | 1.3 |
| 15 | mol % | 0.0 | 61.0 | 14.0 | 16.7 | 2.3 | 2.6 | 0.0 | 0.0 | 1.3 |
| 16 | mol % | 0.0 | 61.0 | 14.0 | 16.7 | 2.3 | 2.6 | 0.0 | 0.0 | 1.3 |
| 17 | mol % | 0.0 | 61.5 | 14.0 | 16.7 | 2.3 | 2.6 | 0.0 | 0.0 | 1.3 |
| 18 | mol % | 0.0 | 60.5 | 14.0 | 16.7 | 2.3 | 2.6 | 1.0 | 0.0 | 1.3 |
| 19 | mol % | 0.0 | 61.7 | 14.0 | 16.7 | 2.3 | 2.6 | 0.0 | 0.0 | 1.3 |
| 20 | mol % | 0.0 | 60.7 | 14.0 | 16.7 | 2.3 | 2.6 | 0.0 | 0.0 | 1.3 |

| Ex. | $Li_2O$ | $Na_2O$ | $K_2O$ | $TiO_2$ | $SnO_2$ | $CeO_2$ | PbO | $P_2O_5$ | Total | $Fe_2O_3$ |
|---|---|---|---|---|---|---|---|---|---|---|
| 1 | 0.5 | 0.0 | 0.0 | 0.4 | 0.1 | 0.1 | 0.0 | 0.0 | 100.0 | 0.00 |
| 2 | 0.0 | 0.0 | 0.0 | 1.2 | 0.0 | 0.0 | 0.0 | 0.0 | 100.0 | 0.00 |
| 3 | 0.0 | 0.0 | 0.0 | 1.2 | 0.0 | 0.0 | 0.0 | 0.0 | 100.0 | 0.00 |
| 4 | 0.0 | 0.0 | 0.0 | 1.2 | 0.2 | 0.2 | 0.0 | 0.0 | 100.0 | 0.00 |
| 5 | 0.0 | 0.0 | 0.0 | 1.7 | 0.0 | 0.0 | 0.0 | 0.0 | 100.0 | 0.00 |
| 6 | 0.0 | 0.0 | 0.0 | 1.2 | 0.1 | 0.1 | 0.0 | 0.0 | 100.0 | 0.00 |
| 7 | 0.0 | 0.0 | 0.0 | 1.2 | 0.2 | 0.2 | 0.0 | 0.0 | 100.0 | 0.00 |
| 8 | 0.0 | 0.0 | 0.0 | 1.2 | 0.2 | 0.2 | 0.0 | 0.0 | 100.0 | 0.00 |
| 9 | 0.5 | 0.0 | 0.0 | 0.0 | 0.0 | 0.0 | 0.0 | 0.0 | 100.0 | 0.00 |
| 10 | 0.0 | 0.0 | 0.0 | 1.2 | 0.1 | 0.1 | 0.0 | 0.0 | 100.0 | 0.00 |
| 11 | 0.0 | 0.0 | 0.0 | 1.7 | 0.0 | 0.0 | 0.0 | 0.0 | 100.0 | 0.00 |
| 12 | 0.0 | 0.0 | 0.0 | 1.2 | 0.2 | 0.2 | 0.0 | 0.0 | 100.0 | 0.00 |
| 13 | 0.0 | 0.0 | 0.0 | 1.2 | 0.2 | 0.2 | 0.0 | 0.0 | 100.0 | 0.00 |
| 14 | 0.0 | 0.0 | 0.0 | 1.2 | 0.2 | 0.2 | 0.0 | 0.0 | 100.0 | 0.00 |
| 15 | 0.5 | 0.0 | 0.0 | 1.2 | 0.2 | 0.2 | 0.0 | 0.0 | 100.0 | 0.00 |
| 16 | 0.0 | 0.5 | 0.0 | 1.2 | 0.2 | 0.2 | 0.0 | 0.0 | 100.0 | 0.00 |
| 17 | 0.0 | 0.0 | 0.0 | 1.2 | 0.2 | 0.2 | 0.0 | 0.0 | 100.0 | 0.02 |
| 18 | 0.0 | 0.0 | 0.0 | 1.2 | 0.2 | 0.2 | 0.0 | 0.0 | 100.0 | 0.00 |
| 19 | 0.0 | 0.0 | 0.0 | 1.2 | 0.1 | 0.1 | 0.0 | 0.0 | 100.0 | 0.00 |
| 20 | 0.0 | 0.0 | 1.0 | 1.2 | 0.1 | 0.1 | 0.0 | 0.0 | 100.0 | 0.00 |

TABLE 1-2

| Ex. | | $B_2O_3$ + SrO + $TiO_2$ + $ZrO_2$ | ZnO + BaO | $TiO_2$ + $ZrO_2$ | $Li_2O$ + $Na_2O$ + $K_2O$ + $B_2O_3$ + ZnO | $(Al_2O_3$ + MgO)/ $(SiO_2$ + CaO) | $SiO_2$ + $Al_2O_3$ | $SiO_2$ + $Al_2O_3$ + MgO + CaO | $Al_2O_3$ + MgO + CaO | (MgO + CaO + $Li_2O$ + $Na_2O$ + $K_2O)/Al_2O_3$ | $TiO_2/$ $(Al_2O_3$ + $ZrO_2$ + SrO) | CaO/ (MgO) + CaO + SrO + BaO) |
|---|---|---|---|---|---|---|---|---|---|---|---|---|
| 1 | mol % | 2.9 | 0.0 | 1.4 | 0.5 | 0.516 | 77.7 | 96.4 | 33.6 | 1.29 | 0.02 | 0.04 |
| 2 | mol % | 4.5 | 0.0 | 2.5 | 0.0 | 0.553 | 74.8 | 95.5 | 35.1 | 1.44 | 0.07 | 0.05 |
| 3 | mol % | 5.8 | 0.0 | 2.5 | 0.0 | 0.500 | 76.3 | 94.2 | 32.6 | 1.22 | 0.06 | 0.06 |
| 4 | mol % | 6.1 | 0.0 | 2.5 | 0.0 | 0.489 | 75.5 | 93.5 | 32.0 | 1.29 | 0.06 | 0.06 |
| 5 | mol % | 4.7 | 0.0 | 2.7 | 0.0 | 0.506 | 77.3 | 95.3 | 33.5 | 1.16 | 0.09 | 0.08 |
| 6 | mol % | 5.5 | 0.0 | 2.8 | 0.0 | 0.485 | 75.8 | 94.3 | 32.6 | 1.31 | 0.07 | 0.08 |
| 7 | mol % | 5.6 | 0.0 | 2.5 | 0.0 | 0.485 | 75.5 | 94.0 | 32.5 | 1.32 | 0.07 | 0.08 |
| 8 | mol % | 5.3 | 0.0 | 2.6 | 0.0 | 0.480 | 75.6 | 94.3 | 32.6 | 1.35 | 0.07 | 0.09 |
| 9 | mol % | 1.6 | 0.0 | 0.6 | 0.5 | 0.490 | 76.3 | 97.9 | 34.2 | 1.75 | 0.00 | 0.09 |
| 10 | mol % | 5.3 | 0.0 | 2.6 | 0.0 | 0.481 | 75.7 | 94.5 | 32.8 | 1.34 | 0.07 | 0.10 |
| 11 | mol % | 3.4 | 0.0 | 2.7 | 0.0 | 0.507 | 77.3 | 96.6 | 34.8 | 1.25 | 0.10 | 0.12 |
| 12 | mol % | 5.1 | 0.0 | 2.5 | 0.0 | 0.481 | 75.5 | 94.5 | 33.0 | 1.36 | 0.07 | 0.11 |
| 13 | mol % | 6.1 | 0.0 | 2.5 | 1.0 | 0.489 | 74.5 | 93.5 | 33.0 | 1.36 | 0.07 | 0.11 |
| 14 | mol % | 6.8 | 0.0 | 2.5 | 1.7 | 0.494 | 73.5 | 92.8 | 33.3 | 1.38 | 0.07 | 0.12 |
| 15 | mol % | 5.1 | 0.0 | 2.5 | 0.5 | 0.485 | 75.0 | 94.0 | 33.0 | 1.39 | 0.07 | 0.11 |
| 16 | mol % | 5.1 | 0.0 | 2.5 | 0.5 | 0.485 | 75.0 | 94.0 | 33.0 | 1.39 | 0.07 | 0.11 |
| 17 | mol % | 5.1 | 0.0 | 2.5 | 0.0 | 0.481 | 75.5 | 94.5 | 33.0 | 1.36 | 0.07 | 0.11 |
| 18 | mol % | 5.1 | 1.0 | 2.5 | 0.0 | 0.489 | 74.5 | 93.5 | 33.0 | 1.36 | 0.07 | 0.10 |

TABLE 1-2-continued

| Ex. | | $B_2O_3 +$ SrO + $TiO_2 +$ $ZrO_2$ | ZnO + BaO | $TiO_2 +$ $ZrO_2$ | $Li_2O +$ $Na_2O +$ $K_2O +$ $B_2O_3 +$ ZnO | $(Al_2O_3 +$ MgO)/ $(SiO_2 +$ CaO) | $SiO_2 +$ $Al_2O_3$ | $SiO_2 +$ $Al_2O_3 +$ MgO + CaO | $Al_2O_3 +$ MgO + CaO | (MgO + CaO + $Li_2O +$ $Na_2O +$ $K_2O)/Al_2O_3$ | $TiO_2/$ $(Al_2O_3 +$ $ZrO_2 +$ SrO) | CaO/ (MgO) + CaO + SrO + BaO) |
|---|---|---|---|---|---|---|---|---|---|---|---|---|
| 19 | mol % | 5.1 | 0.0 | 2.5 | 0.0 | 0.480 | 75.7 | 94.7 | 33.0 | 1.36 | 0.07 | 0.11 |
| 20 | mol % | 5.1 | 0.0 | 2.5 | 1.0 | 0.487 | 74.7 | 93.7 | 33.0 | 1.43 | 0.07 | 0.11 |

TABLE 1-3

| Ex. | Tg (° C.) | α ($10^{-7}$/° C.) | Specific Gravity | Young's Modulus (GPa) | Specific Elastic Modulus (MNm/kg) | Meltability at 1500° C. | Total Amount of Glass Polished by Time Polishing Pad is Replaced (μm) | 1300° C.*16 hr Holding Test | 1270° C.*16 hr Holding Test | 1250° C.*16 hr Holding Test |
|---|---|---|---|---|---|---|---|---|---|---|
| 1 | 800 | 36 | 2.53 | 95.8 | 37.9 | A | 1000 | A | A | D |
| 2 | 787 | 42 | 2.67 | 97.1 | 36.4 | A | 1000 | A | A | E |
| 3 | 790 | 40 | 2.70 | 97.1 | 36.0 | A | 1000 | A | A | E |
| 4 | 787 | 40.4 | 2.68 | 96.7 | 36.1 | A | 1000 | A | A | E |
| 5 | 797 | 40 | 2.60 | 94.0 | 36.2 | A | 1000 | A | A | E |
| 6 | 792 | 40 | 2.68 | 97.2 | 36.3 | A | 1000 | A | A | E |
| 7 | 787 | 40.4 | 2.68 | 96.7 | 36.1 | A | 900 | A | A | E |
| 8 | 790 | 39 | 2.68 | 97.1 | 36.2 | A | 900 | A | A | E |
| 9 | 795 | 42 | 2.56 | 95.3 | 37.2 | A | 900 | A | A | D |
| 10 | 791 | 40 | 2.68 | 97.0 | 36.2 | A | 900 | A | A | D |
| 11 | 798 | 45 | 2.58 | 94.2 | 36.5 | A | 900 | A | A | E |
| 12 | 787 | 40.4 | 2.68 | 96.7 | 36.1 | A | 900 | A | A | D |
| 13 | 777 | 42 | 2.68 | 96.7 | 36.1 | A | 900 | A | A | D |
| 14 | 770 | 43 | 2.69 | 96.7 | 35.9 | A | 900 | A | A | D |
| 15 | 770 | 44 | 2.68 | 96.7 | 36.1 | A | 900 | A | A | D |
| 16 | 773 | 42 | 2.68 | 96.7 | 36.1 | A | 900 | A | A | D |
| 17 | 787 | 40.4 | 2.68 | 96.7 | 36.1 | A | 900 | A | A | D |
| 18 | 784 | 42 | 2.71 | 96.7 | 35.7 | A | 900 | A | A | D |
| 19 | 788 | 39 | 2.67 | 96.5 | 36.1 | A | 900 | A | A | A |
| 20 | 765 | 46 | 2.67 | 96.0 | 35.9 | A | 900 | A | A | C |

TABLE 2-1

| Ex. | | $B_2O_3$ | $SiO_2$ | $Al_2O_3$ | MgO | CaO | SrO | BaO | ZnO | $ZrO_2$ |
|---|---|---|---|---|---|---|---|---|---|---|
| 21 | mol % | 0.0 | 61.4 | 14.1 | 16.7 | 2.4 | 2.6 | 0.0 | 0.0 | 1.3 |
| 22 | mol % | 0.0 | 61.4 | 14.1 | 16.7 | 2.4 | 2.6 | 0.0 | 0.0 | 1.3 |
| 23 | mol % | 0.0 | 64.2 | 12.5 | 14.5 | 2.5 | 2.5 | 0.0 | 0.0 | 3.3 |
| 24 | mol % | 0.0 | 62.5 | 15.1 | 13.2 | 3.0 | 2.8 | 2.0 | 0.0 | 0.0 |
| 25 | mol % | 0.0 | 60.9 | 14.3 | 16.2 | 3.2 | 1.9 | 0.0 | 0.0 | 1.0 |
| 26 | mol % | 0.0 | 61.8 | 14.5 | 15.5 | 3.3 | 1.2 | 0.0 | 0.0 | 1.1 |
| 27 | mol % | 0.0 | 61.0 | 14.4 | 16.2 | 3.4 | 2.0 | 0.0 | 0.0 | 1.3 |
| 28 | mol % | 0.0 | 63.5 | 14.2 | 16.0 | 3.4 | 2.0 | 0.0 | 0.0 | 0.8 |
| 29 | mol % | 0.0 | 60.6 | 14.5 | 16.5 | 3.4 | 2.0 | 0.0 | 0.0 | 0.5 |
| 30 | mol % | 0.0 | 61.0 | 14.5 | 16.5 | 3.5 | 2.0 | 0.0 | 0.0 | 1.3 |
| 31 | mol % | 0.0 | 61.2 | 14.0 | 16.6 | 3.5 | 2.0 | 0.0 | 0.0 | 1.3 |
| 32 | mol % | 0.0 | 61.2 | 14.3 | 16.6 | 3.5 | 2.0 | 0.0 | 0.0 | 1.1 |
| 33 | mol % | 0.0 | 60.8 | 13.0 | 16.5 | 3.5 | 2.5 | 1.0 | 0.0 | 1.0 |
| 34 | mol % | 0.0 | 60.8 | 13.0 | 16.5 | 3.5 | 2.0 | 1.5 | 0.0 | 1.0 |
| 35 | mol % | 0.0 | 60.8 | 14.5 | 16.5 | 3.5 | 2.0 | 0.0 | 0.0 | 1.0 |
| 36 | mol % | 0.0 | 61.8 | 15.5 | 14.5 | 3.5 | 2.0 | 0.0 | 0.0 | 1.0 |
| 37 | mol % | 0.0 | 61.8 | 14.5 | 15.5 | 3.5 | 2.0 | 0.0 | 0.0 | 1.0 |
| 38 | mol % | 0.0 | 62.8 | 14.5 | 14.5 | 3.5 | 2.0 | 0.0 | 0.0 | 1.0 |
| 39 | mol % | 0.0 | 60.8 | 14.5 | 15.5 | 3.5 | 2.0 | 0.0 | 0.0 | 2.0 |
| 40 | mol % | 0.0 | 60.8 | 14.5 | 13.5 | 3.5 | 2.0 | 2.0 | 0.0 | 2.0 |

| Ex. | $Li_2O$ | $Na_2O$ | $K_2O$ | $TiO_2$ | $SnO_2$ | $CeO_2$ | PbO | $P_2O_5$ | Total | $Fe_2O_3$ |
|---|---|---|---|---|---|---|---|---|---|---|
| 21 | 0.0 | 0.0 | 0.0 | 1.2 | 0.2 | 0.1 | 0.0 | 0.0 | 100.0 | 0.02 |
| 22 | 0.0 | 0.0 | 0.0 | 1.2 | 0.2 | 0.1 | 0.0 | 0.0 | 100.0 | 0.05 |
| 23 | 0.5 | 0.0 | 0.0 | 0.0 | 0.0 | 0.0 | 0.0 | 0.0 | 100.0 | 0.00 |
| 24 | 0.0 | 0.0 | 0.0 | 1.4 | 0.0 | 0.0 | 0.0 | 0.0 | 100.0 | 0.00 |
| 25 | 0.0 | 0.0 | 0.0 | 2.5 | 0.0 | 0.0 | 0.0 | 0.0 | 100.0 | 0.00 |
| 26 | 0.0 | 0.0 | 0.0 | 2.6 | 0.0 | 0.0 | 0.0 | 0.0 | 100.0 | 0.00 |
| 27 | 0.0 | 0.0 | 0.0 | 1.7 | 0.0 | 0.0 | 0.0 | 0.0 | 100.0 | 0.00 |
| 28 | 0.0 | 0.0 | 0.0 | 0.0 | 0.1 | 0.0 | 0.0 | 0.0 | 100.0 | 0.00 |
| 29 | 0.0 | 0.0 | 0.0 | 2.5 | 0.0 | 0.0 | 0.0 | 0.0 | 100.0 | 0.00 |
| 30 | 0.0 | 0.0 | 0.0 | 1.2 | 0.0 | 0.0 | 0.0 | 0.0 | 100.0 | 0.00 |
| 31 | 0.0 | 0.0 | 0.0 | 1.2 | 0.1 | 0.1 | 0.0 | 0.0 | 100.0 | 0.00 |

TABLE 2-1-continued

| | | | | | | | | | | |
|---|---|---|---|---|---|---|---|---|---|---|
| 32 | 0.0 | 0.0 | 0.0 | 1.0 | 0.2 | 0.1 | 0.0 | 0.0 | 100.0 | 0.00 |
| 33 | 0.0 | 0.0 | 0.0 | 1.7 | 0.0 | 0.0 | 0.0 | 0.0 | 100.0 | 0.00 |
| 34 | 0.0 | 0.0 | 0.0 | 1.7 | 0.0 | 0.0 | 0.0 | 0.0 | 100.0 | 0.00 |
| 35 | 0.0 | 0.0 | 0.0 | 1.7 | 0.0 | 0.0 | 0.0 | 0.0 | 100.0 | 0.00 |
| 36 | 0.0 | 0.0 | 0.0 | 1.7 | 0.0 | 0.0 | 0.0 | 0.0 | 100.0 | 0.00 |
| 37 | 0.0 | 0.0 | 0.0 | 1.7 | 0.0 | 0.0 | 0.0 | 0.0 | 100.0 | 0.00 |
| 38 | 0.0 | 0.0 | 0.0 | 1.7 | 0.0 | 0.0 | 0.0 | 0.0 | 100.0 | 0.00 |
| 39 | 0.0 | 0.0 | 0.0 | 1.7 | 0.0 | 0.0 | 0.0 | 0.0 | 100.0 | 0.00 |
| 40 | 0.0 | 0.0 | 0.0 | 1.7 | 0.0 | 0.0 | 0.0 | 0.0 | 100.0 | 0.00 |

TABLE 2-2

| Ex. | | $B_2O_3$ + $SrO$ + $TiO_2$ + $ZrO_2$ | $ZnO$ + $BaO$ | $TiO_2$ + $ZrO_2$ | $Li_2O$ + $Na_2O$ + $K_2O$ + $B_2O_3$ + $ZnO$ | $(Al_2O_3$ + $MgO)/$ $(SiO_2$ + $CaO)$ | $SiO_2$ + $Al_2O_3$ | $SiO_2$ + $Al_2O_3$ + $MgO$ + $CaO$ | $Al_2O_3$ + $MgO$ + $CaO$ | $(MgO$ + $CaO$ + $Li_2O$ + $Na_2O$ + $K_2O)/Al_2O_3$ | $TiO_2/$ $(Al_2O_3$ + $ZrO_2$ + $SrO)$ | $CaO/$ $(MgO)$ + $CaO$ + $SrO$ + $BaO)$ |
|---|---|---|---|---|---|---|---|---|---|---|---|---|
| 21 | mol % | 5.1 | 0.0 | 2.5 | 0.0 | 0.483 | 75.5 | 94.6 | 33.2 | 1.35 | 0.07 | 0.11 |
| 22 | mol % | 5.1 | 0.0 | 2.5 | 0.0 | 0.483 | 75.5 | 94.6 | 33.2 | 1.35 | 0.07 | 0.11 |
| 23 | mol % | 5.8 | 0.0 | 3.3 | 0.5 | 0.405 | 76.7 | 93.7 | 29.5 | 1.40 | 0.00 | 0.13 |
| 24 | mol % | 4.2 | 2.0 | 1.4 | 0.0 | 0.432 | 77.6 | 93.8 | 31.3 | 1.07 | 0.08 | 0.14 |
| 25 | mol % | 5.4 | 0.0 | 3.5 | 0.0 | 0.476 | 75.2 | 94.6 | 33.7 | 1.36 | 0.15 | 0.15 |
| 26 | mol % | 4.9 | 0.0 | 3.7 | 0.0 | 0.461 | 76.3 | 95.1 | 33.3 | 1.30 | 0.15 | 0.17 |
| 27 | mol % | 5.0 | 0.0 | 3.0 | 0.0 | 0.475 | 75.4 | 95.0 | 34.0 | 1.36 | 0.10 | 0.16 |
| 28 | mol % | 2.8 | 0.0 | 0.8 | 0.0 | 0.451 | 77.7 | 97.1 | 33.6 | 1.37 | 0.00 | 0.16 |
| 29 | mol % | 5.0 | 0.0 | 3.0 | 0.0 | 0.484 | 75.1 | 95.0 | 34.4 | 1.37 | 0.15 | 0.16 |
| 30 | mol % | 4.5 | 0.0 | 2.5 | 0.0 | 0.481 | 75.5 | 95.5 | 34.5 | 1.38 | 0.07 | 0.16 |
| 31 | mol % | 4.5 | 0.0 | 2.5 | 0.0 | 0.473 | 75.2 | 95.3 | 34.1 | 1.44 | 0.07 | 0.16 |
| 32 | mol % | 4.1 | 0.0 | 2.1 | 0.0 | 0.478 | 75.5 | 95.6 | 34.4 | 1.41 | 0.06 | 0.16 |
| 33 | mol % | 5.2 | 1.0 | 2.7 | 0.0 | 0.459 | 73.8 | 93.8 | 33.0 | 1.54 | 0.10 | 0.15 |
| 34 | mol % | 4.7 | 1.5 | 2.7 | 0.0 | 0.459 | 73.8 | 93.8 | 33.0 | 1.54 | 0.11 | 0.15 |
| 35 | mol % | 4.7 | 0.0 | 2.7 | 0.0 | 0.482 | 75.3 | 95.3 | 34.5 | 1.38 | 0.10 | 0.16 |
| 36 | mol % | 4.7 | 0.0 | 2.7 | 0.0 | 0.459 | 77.3 | 95.3 | 33.5 | 1.16 | 0.09 | 0.18 |
| 37 | mol % | 4.7 | 0.0 | 2.7 | 0.0 | 0.459 | 76.3 | 95.3 | 33.5 | 1.31 | 0.10 | 0.17 |
| 38 | mol % | 4.7 | 0.0 | 2.7 | 0.0 | 0.437 | 77.3 | 95.3 | 32.5 | 1.24 | 0.10 | 0.18 |
| 39 | mol % | 5.7 | 0.0 | 3.7 | 0.0 | 0.467 | 75.3 | 94.3 | 33.5 | 1.31 | 0.09 | 0.17 |
| 40 | mol % | 5.7 | 2.0 | 3.7 | 0.0 | 0.435 | 75.3 | 92.3 | 31.5 | 1.17 | 0.09 | 0.17 |

TABLE 2-3

| Ex. | Tg (° C.) | α ($10^{-7}/°$ C.) | Specific Gravity | Young's Modulus (GPa) | Specific Elastic Modulus (MNm/kg) | Meltability at 1500° C. | Total Amount of Glass Polished by Time Polishing Pad is Replaced (μm) | 1300° C.*16 hr Holding Test | 1270° C.*16 hr Holding Test | 1250° C.*16 hr Holding Test |
|---|---|---|---|---|---|---|---|---|---|---|
| 21 | 786 | 41 | 2.69 | 96.6 | 35.9 | A | 900 | A | A | C |
| 22 | 786 | 41 | 2.69 | 96.6 | 35.9 | A | 900 | A | A | D |
| 23 | 770 | 44 | 2.58 | 94.9 | 36.8 | A | 900 | A | A | D |
| 24 | 809 | 42 | 2.59 | 91.6 | 35.4 | A | 800 | A | A | D |
| 25 | 781 | 39 | 2.66 | 96.9 | 36.4 | A | 800 | A | A | D |
| 26 | 786 | 41 | 2.65 | 96.2 | 36.3 | A | 800 | A | A | E |
| 27 | 788 | 40 | 2.65 | 96.8 | 36.5 | A | 800 | A | A | B |
| 28 | 794 | 40 | 2.56 | 95.6 | 37.3 | A | 800 | A | A | D |
| 29 | 781 | 40 | 2.67 | 96.8 | 36.3 | A | 800 | A | A | D |
| 30 | 792 | 41 | 2.68 | 97.1 | 36.2 | A | 800 | A | A | B |
| 31 | 790 | 40 | 2.67 | 97.0 | 36.3 | A | 800 | A | A | D |
| 32 | 791 | 41 | 2.67 | 97.1 | 36.4 | A | 800 | A | A | D |
| 33 | 789 | 46 | 2.71 | 93.8 | 34.6 | A | 800 | A | A | A |
| 34 | 786 | 46 | 2.70 | 95.7 | 35.4 | A | 800 | A | A | A |
| 35 | 787 | 40 | 2.65 | 96.8 | 38.6 | A | 800 | A | A | A |
| 36 | 802 | 42 | 2.62 | 93.8 | 35.8 | A | 800 | A | A | D |
| 37 | 792 | 43 | 2.63 | 95.8 | 36.4 | A | 800 | A | A | D |
| 38 | 795 | 41 | 2.67 | 94.8 | 35.5 | A | 800 | A | A | D |
| 39 | 794 | 42 | 2.74 | 96.5 | 35.2 | A | 800 | A | A | E |
| 40 | 790 | 46 | 2.74 | 96.8 | 35.3 | A | 800 | A | A | E |

TABLE 3-1

| Ex. | | $B_2O_3$ | $SiO_2$ | $Al_2O_3$ | MgO | CaO | SrO | BaO | ZnO | $ZrO_2$ |
|---|---|---|---|---|---|---|---|---|---|---|
| 41 | mol % | 0.0 | 60.8 | 14.5 | 14.5 | 3.5 | 2.0 | 2.0 | 0.0 | 1.0 |
| 42 | mol % | 0.0 | 60.8 | 14.5 | 15.0 | 3.5 | 2.0 | 1.5 | 0.0 | 1.0 |

TABLE 3-1-continued

| | | | | | | | | | | |
|---|---|---|---|---|---|---|---|---|---|---|
| 43 | mol % | 0.0 | 60.8 | 14.5 | 14.5 | 3.5 | 4.0 | 0.0 | 0.0 | 1.0 |
| 44 | mol % | 0.0 | 60.8 | 14.5 | 13.7 | 4.5 | 4.8 | 0.0 | 0.0 | 1.0 |
| 45 | mol % | 0.0 | 60.5 | 17.2 | 14.2 | 3.8 | 2.1 | 0.0 | 0.0 | 0.8 |
| 46 | mol % | 0.0 | 61.8 | 13.0 | 14.5 | 4.0 | 2.0 | 1.8 | 0.0 | 1.2 |
| 47 | mol % | 0.0 | 64.0 | 13.2 | 13.0 | 4.5 | 2.3 | 0.0 | 0.0 | 1.3 |
| 48 | mol % | 0.0 | 63.0 | 11.8 | 17.2 | 4.5 | 0.9 | 0.0 | 0.0 | 1.8 |
| 49 | mol % | 0.0 | 61.2 | 11.1 | 16.5 | 4.5 | 1.9 | 1.5 | 0.0 | 1.1 |
| 50 | mol % | 0.0 | 61.7 | 15.8 | 12.9 | 4.6 | 1.5 | 1.1 | 0.0 | 1.0 |
| 51 | mol % | 0.0 | 63.1 | 14.7 | 14.5 | 5.0 | 1.3 | 0.1 | 0.0 | 0.0 |
| 52 | mol % | 0.0 | 63.5 | 14.2 | 14.0 | 5.4 | 2.0 | 0.0 | 0.0 | 0.8 |
| 53 | mol % | 0.0 | 55.6 | 12.3 | 18.5 | 5.1 | 2.7 | 1.2 | 0.6 | 2.0 |
| 54 | mol % | 0.0 | 63.3 | 14.4 | 12.2 | 5.7 | 1.6 | 2.0 | 0.0 | 0.0 |
| 55 | mol % | 0.0 | 63.0 | 14.6 | 12.2 | 6.3 | 3.0 | 0.0 | 0.0 | 0.0 |
| 56 | mol % | 0.0 | 62.3 | 14.4 | 14.2 | 6.3 | 2.0 | 0.0 | 0.0 | 0.0 |
| 57 | mol % | 0.0 | 58.3 | 12.6 | 16.1 | 6.5 | 3.0 | 0.0 | 1.5 | 1.2 |

| Ex. | $Li_2O$ | $Na_2O$ | $K_2O$ | $TiO_2$ | $SnO_2$ | $CeO_2$ | PbO | $P_2O_5$ | Total | $Fe_2O_3$ |
|---|---|---|---|---|---|---|---|---|---|---|
| 41 | 0.0 | 0.0 | 0.0 | 1.7 | 0.0 | 0.0 | 0.0 | 0.0 | 100.0 | 0.00 |
| 42 | 0.0 | 0.0 | 0.0 | 1.7 | 0.0 | 0.0 | 0.0 | 0.0 | 100.0 | 0.00 |
| 43 | 0.0 | 0.0 | 0.0 | 1.7 | 0.0 | 0.0 | 0.0 | 0.0 | 100.0 | 0.00 |
| 44 | 0.0 | 0.0 | 0.0 | 0.7 | 0.0 | 0.0 | 0.0 | 0.0 | 100.0 | 0.00 |
| 45 | 0.0 | 0.0 | 0.0 | 1.3 | 0.1 | 0.0 | 0.0 | 0.0 | 100.0 | 0.00 |
| 46 | 0.0 | 0.0 | 0.0 | 1.7 | 0.0 | 0.0 | 0.0 | 0.0 | 100.0 | 0.00 |
| 47 | 0.0 | 0.5 | 0.0 | 1.2 | 0.0 | 0.0 | 0.0 | 0.0 | 100.0 | 0.00 |
| 48 | 0.0 | 0.0 | 0.0 | 0.8 | 0.0 | 0.0 | 0.0 | 0.0 | 100.0 | 0.00 |
| 49 | 0.0 | 0.5 | 0.0 | 1.7 | 0.0 | 0.0 | 0.0 | 0.0 | 100.0 | 0.00 |
| 50 | 0.0 | 1.4 | 0.0 | 0.0 | 0.0 | 0.0 | 0.0 | 0.0 | 100.0 | 0.00 |
| 51 | 0.0 | 0.3 | 0.0 | 0.8 | 0.1 | 0.1 | 0.0 | 0.0 | 100.0 | 0.00 |
| 52 | 0.0 | 0.0 | 0.0 | 0.0 | 0.1 | 0.0 | 0.0 | 0.0 | 100.0 | 0.00 |
| 53 | 0.0 | 0.0 | 0.0 | 2.0 | 0.0 | 0.0 | 0.0 | 0.0 | 100.0 | 0.00 |
| 54 | 0.0 | 0.0 | 0.0 | 0.8 | 0.0 | 0.0 | 0.0 | 0.0 | 100.0 | 0.00 |
| 55 | 0.0 | 0.0 | 0.0 | 0.9 | 0.0 | 0.0 | 0.0 | 0.0 | 100.0 | 0.00 |
| 56 | 0.0 | 0.0 | 0.0 | 0.8 | 0.0 | 0.0 | 0.0 | 0.0 | 100.0 | 0.00 |
| 57 | 0.0 | 0.0 | 0.0 | 0.8 | 0.0 | 0.0 | 0.0 | 0.0 | 100.0 | 0.00 |

TABLE 3-2

| Ex. | $B_2O_3$ + SrO + $TiO_2$ + $ZrO_2$ | ZnO + BaO | $TiO_2$ + $ZrO_2$ | $Li_2O$ + $Na_2O$ + $K_2O$ + $B_2O_3$ + ZnO | $(Al_2O_3$ + MgO)/ $(SiO_2$ + CaO) | $SiO_2$ + $Al_2O_3$ | $SiO_2$ + $Al_2O_3$ + MgO + CaO | $Al_2O_3$ + MgO + CaO | (MgO + CaO + $Li_2O$ + $Na_2O$ + $K_2O)/Al_2O_3$ | $TiO_2/$ $(Al_2O_3$ + $ZrO_2$ + SrO) | CaO/ (MgO) + CaO + SrO + BaO) |
|---|---|---|---|---|---|---|---|---|---|---|---|
| 41 mol % | 4.7 | 2.0 | 2.7 | 0.0 | 0.451 | 75.3 | 93.3 | 32.5 | 1.24 | 0.10 | 0.16 |
| 42 mol % | 4.7 | 1.5 | 2.7 | 0.0 | 0.459 | 75.3 | 93.8 | 33.0 | 1.28 | 0.10 | 0.16 |
| 43 mol % | 6.7 | 0.0 | 2.7 | 0.0 | 0.451 | 75.3 | 93.3 | 32.5 | 1.24 | 0.09 | 0.16 |
| 44 mol % | 6.5 | 0.0 | 1.7 | 0.0 | 0.432 | 75.3 | 93.5 | 32.7 | 1.26 | 0.03 | 0.20 |
| 45 mol % | 4.2 | 0.0 | 2.1 | 0.0 | 0.488 | 77.7 | 95.7 | 35.2 | 1.05 | 0.06 | 0.19 |
| 46 mol % | 4.9 | 1.8 | 2.9 | 0.0 | 0.418 | 74.8 | 93.3 | 31.5 | 1.42 | 0.10 | 0.18 |
| 47 mol % | 4.8 | 0.0 | 2.5 | 0.5 | 0.382 | 77.2 | 94.7 | 30.7 | 1.36 | 0.07 | 0.23 |
| 48 mol % | 3.5 | 0.0 | 2.6 | 0.0 | 0.430 | 74.8 | 96.5 | 33.5 | 1.84 | 0.06 | 0.20 |
| 49 mol % | 4.7 | 1.5 | 2.8 | 0.5 | 0.420 | 72.3 | 93.3 | 32.1 | 1.94 | 0.12 | 0.18 |
| 50 mol % | 2.5 | 1.1 | 1.0 | 1.4 | 0.433 | 77.5 | 95.0 | 33.3 | 1.20 | 0.00 | 0.23 |
| 51 mol % | 2.1 | 0.1 | 0.8 | 0.3 | 0.429 | 77.8 | 97.3 | 34.2 | 1.35 | 0.05 | 0.24 |
| 52 mol % | 2.8 | 0.0 | 0.8 | 0.0 | 0.409 | 77.7 | 97.1 | 33.6 | 1.37 | 0.00 | 0.25 |
| 53 mol % | 6.7 | 1.8 | 4.0 | 0.6 | 0.507 | 67.9 | 91.5 | 35.9 | 1.92 | 0.12 | 0.19 |
| 54 mol % | 2.4 | 2.0 | 0.8 | 0.0 | 0.386 | 77.7 | 95.6 | 32.3 | 1.24 | 0.05 | 0.27 |
| 55 mol % | 3.9 | 0.0 | 0.9 | 0.0 | 0.387 | 77.6 | 96.1 | 33.1 | 1.27 | 0.05 | 0.29 |
| 56 mol % | 2.8 | 0.0 | 0.8 | 0.0 | 0.417 | 76.7 | 97.2 | 34.9 | 1.42 | 0.05 | 0.28 |
| 57 mol % | 5.0 | 1.5 | 2.0 | 1.5 | 0.443 | 70.9 | 93.5 | 35.2 | 1.79 | 0.05 | 0.25 |

TABLE 3-3

| Ex. | Tg (° C.) | α $(10^{-7}/°$ C.) | Specific Gravity | Young's Modulus (GPa) | Specific Elastic Modulus (MNm/kg) | Meltability at 1500° C. | Total Amount of Glass Polished by Time Polishing Pad is Replaced (μm) | 1300° C.*16 hr Holding Test | 1270° C.*16 hr Holding Test | 1250° C.*16 hr Holding Test |
|---|---|---|---|---|---|---|---|---|---|---|
| 41 | 785 | 44 | 2.74 | 94.8 | 34.6 | A | 800 | A | A | C |
| 42 | 784 | 44 | 2.78 | 93.7 | 33.7 | A | 800 | A | A | B |
| 43 | 781 | 46 | 2.69 | 96.2 | 35.8 | A | 800 | A | A | C |
| 44 | 777 | 47 | 2.73 | 95.4 | 34.9 | A | 800 | A | A | C |
| 45 | 795 | 39 | 2.56 | 94.6 | 37.0 | A | 800 | A | A | D |
| 46 | 783 | 47 | 2.77 | 93.1 | 33.6 | A | 700 | A | A | A |

TABLE 3-3-continued

| Ex. | Tg (° C.) | α (10⁻⁷/° C.) | Specific Gravity | Young's Modulus (GPa) | Specific Elastic Modulus (MNm/kg) | Meltability at 1500° C. | Total Amount of Glass Polished by Time Polishing Pad is Replaced (μm) | 1300° C.*16 hr Holding Test | 1270° C.*16 hr Holding Test | 1250° C.*16 hr Holding Test |
|---|---|---|---|---|---|---|---|---|---|---|
| 47 | 780 | 46 | 2.59 | 95.8 | 37.0 | A | 700 | A | A | D |
| 48 | 792 | 54 | 2.61 | 93.6 | 35.9 | A | 700 | A | A | D |
| 49 | 763 | 48 | 2.78 | 91.6 | 33.0 | A | 700 | A | A | D |
| 50 | 780 | 46 | 2.61 | 92.7 | 35.5 | A | 700 | A | A | D |
| 51 | 795 | 39 | 2.56 | 94.3 | 36.8 | A | 700 | A | A | D |
| 52 | 791 | 42 | 2.57 | 93.7 | 36.5 | A | 600 | A | A | D |
| 53 | 762 | 51 | 2.74 | 94.2 | 34.4 | A | 600 | A | A | D |
| 54 | 798 | 52 | 2.60 | 91.5 | 35.2 | A | 600 | A | A | D |
| 55 | 790 | 42 | 2.58 | 93.4 | 36.2 | A | 500 | A | A | D |
| 56 | 791 | 46 | 2.59 | 92.6 | 35.8 | A | 500 | A | A | D |
| 57 | 764 | 51 | 2.69 | 97.5 | 36.2 | A | 500 | A | A | D |

TABLE 4-1

| Ex. | | $B_2O_3$ | $SiO_2$ | $Al_2O_3$ | MgO | CaO | SrO | BaO | ZnO | $ZrO_2$ |
|---|---|---|---|---|---|---|---|---|---|---|
| 58 | mol % | 0.0 | 65.2 | 15.8 | 10.9 | 4.7 | 0.0 | 1.1 | 0.0 | 0.5 |
| 59 | mol % | 0.0 | 65.2 | 15.8 | 10.9 | 4.7 | 0.0 | 1.1 | 0.0 | 0.5 |
| 60 | mol % | 0.0 | 64.6 | 15.8 | 10.9 | 4.7 | 0.0 | 1.1 | 0.0 | 0.5 |
| 61 | mol % | 0.0 | 63.7 | 16.8 | 10.9 | 4.7 | 0.0 | 1.1 | 0.0 | 0.5 |
| 62 | mol % | 0.0 | 62.9 | 16.8 | 11.9 | 4.7 | 0.0 | 1.1 | 0.0 | 0.5 |
| 63 | mol % | 0.0 | 64.7 | 15.8 | 10.9 | 4.7 | 0.0 | 1.1 | 0.0 | 0.5 |
| 64 | mol % | 0.0 | 64.2 | 15.8 | 10.9 | 4.7 | 0.0 | 1.1 | 0.0 | 0.5 |
| 65 | mol % | 0.0 | 64.2 | 15.8 | 10.9 | 4.7 | 0.0 | 1.1 | 0.0 | 0.5 |
| 66 | mol % | 0.0 | 62.2 | 15.8 | 11.9 | 5.7 | 0.0 | 1.1 | 0.0 | 0.5 |
| 67 | mol % | 0.0 | 62.2 | 15.8 | 11.9 | 3.7 | 2.0 | 1.1 | 0.0 | 0.5 |
| 68 | mol % | 0.0 | 62.8 | 15.8 | 11.9 | 3.7 | 0.0 | 2.5 | 0.0 | 0.5 |
| 69 | mol % | 0.0 | 63.2 | 16.3 | 10.9 | 4.7 | 0.0 | 1.1 | 0.0 | 0.5 |
| 70 | mol % | 0.0 | 65.2 | 15.8 | 10.9 | 4.7 | 0.0 | 1.1 | 0.0 | 0.5 |
| 71 | mol % | 0.0 | 63.7 | 15.8 | 10.9 | 4.7 | 0.0 | 1.1 | 0.0 | 0.5 |

| Ex. | $Li_2O$ | $Na_2O$ | $K_2O$ | $TiO_2$ | $SnO_2$ | $CeO_2$ | PbO | $P_2O_5$ | Total | $Fe_2O_3$ |
|---|---|---|---|---|---|---|---|---|---|---|
| 58 | 1.1 | 0.3 | 0.0 | 0.0 | 0.2 | 0.2 | 0.0 | 0.0 | 100.0 | 0.00 |
| 59 | 1.4 | 0.0 | 0.0 | 0.0 | 0.2 | 0.2 | 0.0 | 0.0 | 100.0 | 0.00 |
| 60 | 1.4 | 0.3 | 0.0 | 0.0 | 0.2 | 0.2 | 0.0 | 0.0 | 100.0 | 0.00 |
| 61 | 1.4 | 0.5 | 0.0 | 0.0 | 0.2 | 0.2 | 0.0 | 0.0 | 100.0 | 0.00 |
| 62 | 1.4 | 0.3 | 0.0 | 0.0 | 0.2 | 0.2 | 0.0 | 0.0 | 100.0 | 0.00 |
| 63 | 1.9 | 0.0 | 0.0 | 0.0 | 0.2 | 0.2 | 0.0 | 0.0 | 100.0 | 0.00 |
| 64 | 0.0 | 1.0 | 1.4 | 0.0 | 0.2 | 0.2 | 0.0 | 0.0 | 100.0 | 0.00 |
| 65 | 0.0 | 2.4 | 0.0 | 0.0 | 0.2 | 0.2 | 0.0 | 0.0 | 100.0 | 0.00 |
| 66 | 0.0 | 2.4 | 0.0 | 0.0 | 0.2 | 0.2 | 0.0 | 0.0 | 100.0 | 0.00 |
| 67 | 0.0 | 2.4 | 0.0 | 0.0 | 0.2 | 0.2 | 0.0 | 0.0 | 100.0 | 0.00 |
| 68 | 0.0 | 2.4 | 0.0 | 0.0 | 0.2 | 0.2 | 0.0 | 0.0 | 100.0 | 0.00 |
| 69 | 0.0 | 2.9 | 0.0 | 0.0 | 0.2 | 0.2 | 0.0 | 0.0 | 100.0 | 0.00 |
| 70 | 0.0 | 0.0 | 1.4 | 0.0 | 0.2 | 0.2 | 0.0 | 0.0 | 100.0 | 0.00 |
| 71 | 0.0 | 0.5 | 2.4 | 0.0 | 0.2 | 0.2 | 0.0 | 0.0 | 100.0 | 0.00 |

TABLE 4-2

| Ex. | | $B_2O_3$ + SrO + $TiO_2$ + $ZrO_2$ | ZnO + BaO | $TiO_2$ + $ZrO_2$ | $Li_2O$ + $Na_2O$ + $K_2O$ + $B_2O_3$ + ZnO | ($Al_2O_3$ + MgO)/($SiO_2$ + CaO) | $SiO_2$ + $Al_2O_3$ | $SiO_2$ + $Al_2O_3$ + MgO + CaO | $Al_2O_3$ + MgO + CaO | (MgO + CaO + $Li_2O$ + $Na_2O$ + $K_2O$)/$Al_2O_3$ | $TiO_2$/($Al_2O_3$ + $ZrO_2$ + SrO) | CaO/(MgO + CaO + SrO + BaO) |
|---|---|---|---|---|---|---|---|---|---|---|---|---|
| 58 | mol % | 0.5 | 1.1 | 0.5 | 1.4 | 0.382 | 81.0 | 96.6 | 31.4 | 1.08 | 0.00 | 0.28 |
| 59 | mol % | 0.5 | 1.1 | 0.5 | 1.4 | 0.382 | 81.0 | 96.6 | 31.4 | 1.08 | 0.00 | 0.28 |
| 60 | mol % | 0.5 | 1.1 | 0.5 | 1.7 | 0.384 | 80.7 | 96.3 | 31.4 | 1.09 | 0.00 | 0.28 |
| 61 | mol % | 0.5 | 1.1 | 0.5 | 1.9 | 0.405 | 80.5 | 96.1 | 32.4 | 1.04 | 0.00 | 0.28 |
| 62 | mol % | 0.5 | 1.1 | 0.5 | 1.7 | 0.425 | 79.7 | 96.3 | 33.4 | 1.09 | 0.00 | 0.27 |
| 63 | mol % | 0.5 | 1.1 | 0.5 | 1.9 | 0.385 | 80.5 | 96.1 | 31.4 | 1.11 | 0.00 | 0.28 |
| 64 | mol % | 0.5 | 1.1 | 0.5 | 2.4 | 0.388 | 80.0 | 95.6 | 31.4 | 1.14 | 0.00 | 0.28 |
| 65 | mol % | 0.5 | 1.1 | 0.5 | 2.4 | 0.388 | 80.0 | 95.6 | 31.4 | 1.14 | 0.00 | 0.28 |
| 66 | mol % | 0.5 | 1.1 | 0.5 | 2.4 | 0.408 | 78.0 | 95.6 | 33.4 | 1.27 | 0.00 | 0.30 |
| 67 | mol % | 2.5 | 1.1 | 0.5 | 2.4 | 0.420 | 78.0 | 93.6 | 31.4 | 1.14 | 0.00 | 0.20 |
| 68 | mol % | 0.5 | 2.5 | 0.5 | 2.4 | 0.417 | 78.6 | 94.2 | 31.4 | 1.14 | 0.00 | 0.20 |
| 69 | mol % | 0.5 | 1.1 | 0.5 | 2.9 | 0.401 | 79.5 | 95.1 | 31.9 | 1.13 | 0.00 | 0.28 |

TABLE 4-2-continued

| Ex. | | B$_2$O$_3$ + SrO + TiO$_2$ + ZrO$_2$ | ZnO + BaO | TiO$_2$ + ZrO$_2$ | Li$_2$O + Na$_2$O + K$_2$O + B$_2$O$_3$ + ZnO | (Al$_2$O$_3$ + MgO)/ (SiO$_2$ + CaO) | SiO$_2$ + Al$_2$O$_3$ | SiO$_2$ + Al$_2$O$_3$ + MgO + CaO | Al$_2$O$_3$ + MgO + CaO | (MgO + CaO + Li$_2$O + Na$_2$O + K$_2$O)/Al$_2$O$_3$ | TiO$_2$/ (Al$_2$O$_3$ + ZrO$_2$ + SrO) | CaO/ (MgO) + CaO + SrO + BaO) |
|---|---|---|---|---|---|---|---|---|---|---|---|---|
| 70 | mol % | 0.5 | 1.1 | 0.5 | 1.4 | 0.382 | 81.0 | 96.6 | 31.4 | 1.08 | 0.00 | 0.28 |
| 71 | mol % | 0.5 | 1.1 | 0.5 | 2.9 | 0.390 | 79.5 | 95.1 | 31.4 | 1.17 | 0.00 | 0.28 |

TABLE 4-3

| Ex. | Tg (° C.) | α (10$^{-7}$/° C.) | Specific Gravity | Young's Modulus (GPa) | Specific Elastic Modulus (MNm/kg) | Meltability at 1500° C. | Total Amount of Glass Polished by Time Polishing Pad is Replaced (μm) | 1300° C.*16 hr Holding Test | 1270° C.*16 hr Holding Test | 1250° C.*16 hr Holding Test |
|---|---|---|---|---|---|---|---|---|---|---|
| 58 | 775 | 44 | 2.60 | 92.1 | 35.4 | A | 700 | A | A | A |
| 59 | 780 | 48 | 2.60 | 92.5 | 35.6 | A | 700 | A | A | A |
| 60 | 774 | 43 | 2.60 | 92.6 | 35.6 | A | 700 | A | A | A |
| 61 | 775 | 45 | 2.61 | 92.7 | 35.5 | A | 700 | A | A | A |
| 62 | 775 | 44 | 2.61 | 93.5 | 35.8 | A | 700 | A | A | A |
| 63 | 770 | 47 | 2.59 | 92.9 | 35.9 | A | 700 | A | A | B |
| 64 | 784 | 49 | 2.57 | 90.5 | 35.2 | A | 700 | A | A | A |
| 65 | 784 | 49 | 2.59 | 91.5 | 35.3 | A | 700 | A | A | A |
| 66 | 775 | 58 | 2.60 | 89.8 | 34.5 | A | 600 | A | A | A |
| 67 | 770 | 51 | 2.62 | 89.4 | 34.1 | A | 800 | A | A | A |
| 68 | 772 | 53 | 2.64 | 88.8 | 33.6 | A | 800 | A | A | A |
| 69 | 774 | 52 | 2.60 | 89.2 | 34.3 | A | 700 | A | A | A |
| 70 | 806 | 46 | 2.54 | 90.4 | 35.6 | A | 700 | A | A | B |
| 71 | 788 | 55 | 2.56 | 89.5 | 35.0 | A | 700 | A | A | A |

[Production of Magnetic Recording Medium (Magnetic Disk)]

Using the following methods, an adhesive layer, an undercoat layer, a magnetic recording layer, a protective layer, and a lubricating layer were formed in that order on the main surface of the magnetic-disk glass substrate produced above to thereby obtain a magnetic disk.

First, through the use of an evacuated film formation apparatus, an adhesive layer, an undercoat layer, and a magnetic recording layer were sequentially formed using a DC magnetron sputtering method in an Ar atmosphere.

At this time, the adhesive layer was formed through the use of a CrTi target so as to give an amorphous CrTi layer having a thickness of 20 nm. Furthermore, a layer that was comprised of MgO and had a thickness of 10 nm was formed as an undercoat layer. Furthermore, a magnetic recording layer was formed at a film formation temperature of 200° C. to 400° C. through the use of an FePtC or CoPtC target so as to give an FePt granular layer or a CoPt granular layer having a thickness of 10 nm.

A magnetic disk, in which film formation up to the magnetic recording layer had been finished, was moved from the film formation apparatus into a heating furnace to thereby be subjected to annealing. The temperature in the heating furnace in annealing was set in a range of 500° C. to 700° C. Magnetic particles made of a CoPt-based alloy or an FePt-based alloy having an $L_{10}$ ordered structure were formed through this annealing process. Note that there is no limitation thereto, and heating need only be performed to realize an $L_{10}$ ordered structure.

Then, a 3 nm protective layer comprised of hydrogenated carbon was formed using a CVD method using ethylene as material gas. After that, a lubricating layer was formed using PFPE (perfluoropolyether) and using a dip coating method. The thickness of the lubricating layer was 1 nm.

A magnetic disk was obtained by the above-described manufacturing process. The obtained magnetic disk was mounted on a hard disk drive provided with a DFH mechanism and magnetic signals were recorded with a recording density of 1000 gigabits per 1 square inch in a recording region on the main surface of the magnetic disk, and were reproduced. At this time, a phenomenon (crash failure), in which a magnetic head and a magnetic disk surface collide with each other, was not confirmed.

Also, a glass spacer obtained by forming an NiP alloy-conductive film on a surface of the glass spacer obtained through the above-described manufacturing process with the use of glass of an example (a glass spacer provided with an NiP-alloy film) was mounted on a hard disk drive provided with a DFH mechanism, and magnetic signals were recorded with a recording density of 1000 gigabits per 1 square inch in a recording region on the main surface of a magnetic disk, which was separately prepared using a substrate made of a material that is different from that of glass according to an aspect of the present invention, and were reproduced. At this time, a phenomenon (crash failure), in which a magnetic head and a magnetic disk surface collide with each other, was not confirmed.

Also, the magnetic disk that was manufactured above and the glass spacer provided with the NiP-alloy film that was manufactured above, using the same glass material according an aspect of the present invention were mounted on a hard disk drive provided with a DFH mechanism, and magnetic signals were recorded with a recording density of 1000 gigabits per 1 square inch in a recording region on the main surface of the magnetic disk, and were reproduced. At this time, a phenomenon (crash failure), in which a magnetic head and a magnetic disk surface collide with each other, was not confirmed. Here, the glass substrate included in the above-described magnetic disk and the above-described glass spacer were comprised of the same glass material, and thus phenomena that may occur due to the above-described difference in the thermal expansion coefficient do not occur.

According to an aspect of the present invention, it is possible to provide a magnetic recording medium suitable for high-density recording.

COMPARATIVE EXAMPLES

With regard to the exemplary glass compositions shown in Table 5 below described in JP 2015-224150A, the productivity was evaluated using the same method as in the above examples. The results are shown in Table 5.

TABLE 5

| Comp. Ex. | Meltability at 1500° C. | Total Amount of Glass Polished by Time Polishing Pad is Replaced (μm) |
|---|---|---|
| Ex. 1 in JP 2015-224150A | B | 150 |
| Ex. 2 in JP 2015-224150A | A | 150 |
| Ex. 3 in JP 2015-224150A | B | 150 |
| Ex. 4 in JP 2015-224150A | B | 150 |
| Ex. 5 in JP 2015-224150A | B | 150 |
| Ex. 6 in JP 2015-224150A | A | 100 |
| Ex. 8 in JP 2015-224150A | B | 600 |
| Ex. 10 in JP 2015-224150A | B | 500 |
| Ex. 11 in JP 2015-224150A | B | 500 |
| Ex. 12 in JP 2015-224150A | B | 150 |
| Ex. 13 in JP 2015-224150A | B | 150 |

Finally, the aforementioned respective aspects are summarized.

According to an aspect, provided is a glass (glass A) for a magnetic recording medium substrate or for a glass spacer for a magnetic recording/reproducing apparatus, in which the total content of $Li_2O$, $Na_2O$, $K_2O$, $B_2O_3$, and ZnO ($Li_2O+Na_2O+K_2O+B_2O_3+ZnO$) is in a range of 0 mol % or more and 3 mol % or less, the mole ratio of the total content of $Al_2O_3$ and MgO relative to the total content of $SiO_2$ and CaO [$(Al_2O_3+MgO)/(SiO_2+CaO)$] is in a range of 0.30 or more and 0.6 or less, the total content of $SiO_2$ and $Al_2O_3$ ($SiO_2+Al_2O_3$) is in a range of 64 mol % or more and 85 mol % or less, and the total content of $SiO_2$, $Al_2O_3$, MgO, and CaO ($SiO_2+Al_2O_3+MgO+CaO$) is in a range of 87 mol % or more and 98 mol % or less.

Also, according to an aspect, provided is a glass (glass B) for a magnetic recording medium substrate or for a glass spacer for a magnetic recording/reproducing apparatus, in which the mole ratio of the total content of $Al_2O_3$ and MgO relative to the total content of $SiO_2$ and CaO [$(Al_2O_3+MgO)/(SiO_2+CaO)$] is in a range of 0.30 or more and 0.6 or less, the total content of $SiO_2$ and $Al_2O_3$ ($SiO_2+AlO_3$) is in a range of 64 mol % or more and 85 mol % or less, the total content of $SiO_2$, $Al_2O_3$, MgO, and CaO ($SiO_2+Al_2O_3+MgO+CaO$) is in a range of 87 mol % or more and 98 mol % or less, and the glass has a glass transition temperature of 740° C. or more.

The glass A and the glass B can be a glass for a magnetic recording medium substrate or for a glass spacer for a magnetic recording/reproducing apparatus having high heat resistance and productivity.

In an embodiment, in the glass A and the glass B, the $SiO_2$ content may be in a range of 55 mol % or more and 66 mol % or less.

In an embodiment, in the glass A and the glass B, the $Al_2O_3$ content may be in a range of 10 mol % or more and 18 mol % or less.

In an embodiment, in the glass A and the glass B, the MgO content may be in a range of 8 mol % or more and 20 mol % or less.

In an embodiment, in the glass A and the glass B, the CaO content may be in a range of 0 mol % or more and 7 mol % or less.

In an embodiment, in the glass A and the glass B, the mole ratio of the CaO content relative to the total content of MgO, CaO, SrO, and BaO [$CaO/(MgO+CaO+SrO+BaO)$] may be 0.4 or less.

In an embodiment, the glass A and the glass B may have a Young's modulus of 86 GPa or more.

In an embodiment, the glass A and the glass B may have a specific gravity of 2.8 or less.

In an embodiment, the glass A and the glass B may have a specific elastic modulus of 30 MNm/kg or more.

According to an embodiment, a magnetic recording medium substrate (magnetic recording medium substrate a) made of the glass A is provided.

Also, according to an embodiment, a magnetic recording medium substrate (magnetic recording medium substrate b) made of the glass B is provided.

According to an embodiment, a magnetic recording medium having the above magnetic recording medium substrate and the above magnetic recording layer is provided.

According to an embodiment, a glass spacer ("glass spacer a") for a magnetic recording/reproducing apparatus made of the glass A is provided.

Also, according to an embodiment, a glass spacer ("glass spacer b") for a magnetic recording/reproducing apparatus made of the glass B is provided.

According to an embodiment, provided is a magnetic recording/reproducing apparatus that includes one or more selected from the group consisting of the magnetic recording medium a, the magnetic recording medium b, the glass spacer a, and the glass spacer b.

It should be considered that all the embodiments disclosed this time are exemplifications in all respects and are not restrictive ones. It is intended that the scope of the present invention is shown not by the above explanations but by the claims, and that all changes in equivalent meanings and ranges to the scope of the claims are included.

By subjecting the glass composition exemplified above to the composition adjustment described in this specification, a glass for a magnetic recording medium substrate and a glass spacer for a magnetic recording/reproducing apparatus according to respective aspects of the present invention can be produced, for example.

Furthermore, it is possible, needless to say, to combine arbitrarily 2 or more items exemplified or described as preferable ranges in the specification.

The invention claimed is:
1. A glass for a magnetic recording medium substrate or for a glass spacer for a magnetic recording/reproducing apparatus,
wherein a mole ratio of the total content of $Al_2O_3$ and MgO relative to the total content of $SiO_2$ and CaO [$(A_2O_3+MgO)/(SiO_2+CaO)$] is in a range of 0.417 or more and 0.6 or less,
the total content of $SiO_2$ and $Al_2O_3$ ($SiO_2+Al_2O_3$) is in a range of 64 mol % or more and 85 mol % or less,
the total content of $SiO_2$, $Al_2O_3$, MgO, and CaO ($SiO_2+Al_2O_3+MgO+CaO$) is in a range of 87 mol % or more and 98 mol % or less,
the total content of $TiO_2$ and $ZrO_2$ ($TiO_2+ZrO_2$) is 0.5 mol % or more, the glass has a glass transition temperature of 740° C. or more, an average linear expansion coefficient of the glass at 100° C. to 300° C. is $68\times10^{-7}$/° C. or less, and the total content of $Li_2O$, $Na_2O$, $K_2O$, $B_2O_3$, and ZnO ($Li_2O+Na_2O+K_2O+B_2O_3+ZnO$) is in a range of 0 mol % or more and 3 mol % or less.

2. The glass according to claim 1, wherein the glass has the glass transition temperature of 760° C. or more.

3. The glass according to claim 2, wherein the $SiO_2$ content is in a range of 55 mol % or more and 66 mol % or less.

4. The glass according to claim 2, wherein the $Al_2O_3$ content is in a range of 10 mol % or more and 18 mol % or less.

5. The glass according to claim 2, wherein the MgO content is in a range of 8 mol % or more and 20 mol % or less.

6. The glass according to claim 2, wherein a mole ratio of the CaO content relative to the total content of MgO, CaO, SrO, and BaO [CaO/(MgO+CaO+SrO+BaO)] is 0.4 or less.

7. The glass according to claim 2, wherein the glass has a Young's modulus of 86 GPa or more.

8. The glass according to claim 2, wherein the glass has a specific gravity of 2.8 or less.

9. The glass according to claim 2, wherein the glass has a specific elastic modulus of 30 MNm/kg or more.

10. A magnetic recording medium substrate comprised of the glass according to claim 2.

11. A magnetic recording medium comprising:

the magnetic recording medium substrate according to claim 10; and a magnetic recording layer.

12. The glass according to claim 1, wherein the $SiO_2$ content is in a range of 55 mol % or more and 66 mol % or less.

13. The glass according to claim 1, wherein the $Al_2O_3$ content is in a range of 10 mol % or more and 18 mol % or less.

14. The glass according to claim 1, wherein the MgO content is in a range of 8 mol % or more and 20 mol % or less.

15. The glass according to claim 1, wherein a mole ratio of the CaO content relative to the total content of MgO, CaO, SrO, and BaO [CaO/(MgO+CaO+SrO+BaO)] is 0.4 or less.

16. The glass according to claim 1, wherein the glass has a Young's modulus of 86 GPa or more.

17. The glass according to claim 1, wherein the glass has a specific gravity of 2.8 or less.

18. The glass according to claim 1, wherein the glass has a specific elastic modulus of 30 MNm/kg or more.

19. A magnetic recording medium substrate comprised of the glass according to claim 1.

20. A magnetic recording medium comprising:

the magnetic recording medium substrate according to claim 19; and a magnetic recording layer.

* * * * *